US010009957B2

(12) United States Patent
Pereira et al.

(10) Patent No.: US 10,009,957 B2
(45) Date of Patent: Jun. 26, 2018

(54) ELECTRONIC OVEN WITH INFRARED EVALUATIVE CONTROL

(71) Applicant: The Markov Corporation, Dover, DE (US)

(72) Inventors: Arvind Antonio de Menezes Pereira, Milpitas, CA (US); Leonard Robert Speiser, Los Altos, CA (US); Nick C. Leindecker, Portola Valley, CA (US)

(73) Assignee: The Markov Corporation, Dover, DE (US)

( * ) Notice: Subject to any disclaimer, the term of this patent is extended or adjusted under 35 U.S.C. 154(b) by 0 days. days.

(21) Appl. No.: 15/467,975

(22) Filed: Mar. 23, 2017

(65) Prior Publication Data
US 2017/0290095 A1 Oct. 5, 2017

Related U.S. Application Data

(60) Provisional application No. 62/315,175, filed on Mar. 30, 2016, provisional application No. 62/445,628, (Continued)

(51) Int. Cl.
H05B 6/68 (2006.01)
H05B 6/66 (2006.01)
(Continued)

(52) U.S. Cl.
CPC ......... *H05B 1/0263* (2013.01); *G05B 19/042* (2013.01); *G06N 99/005* (2013.01); *H05B 6/6455* (2013.01); *G05B 2219/2643* (2013.01)

(58) Field of Classification Search
CPC .. H05B 1/0263; H05B 6/6455; G05B 19/042; G05B 2219/2643; G06N 99/005
(Continued)

(56) References Cited

U.S. PATENT DOCUMENTS 2,704,802 A 3/1955 Blass et al.
3,182,166 A 5/1965 Helmut et al.
(Continued)

FOREIGN PATENT DOCUMENTS

BE 1020505 A3 11/2013
CN 1680790 A 10/2005
(Continued)

OTHER PUBLICATIONS

J. Ibarra, et al., Combined IR Imaging-Neural Network Method for the Estimation of Internal Temperature in Cooked Chicken Meat, Opt. Eng. 39(11) 3032-3038, Nov. 2000.
(Continued)

*Primary Examiner* — Quang Van
(74) *Attorney, Agent, or Firm* — Daylight Law, P.C.

(57) ABSTRACT

A disclosed computer-implemented method for heating an item in a chamber of an electronic oven towards a target state includes heating the item with a set of applications of energy to the chamber while the electronic oven is in a respective set of configurations. The set of applications of energy and respective set of configurations define a respective set of variable distributions of energy in the chamber. The method also includes sensing sensor data that defines a respective set of responses by the item to the set of applications of energy. The method also includes generating a plan to heat the item in the chamber. The plan is generated by a control system of the electronic oven and uses the sensor data.

30 Claims, 16 Drawing Sheets

Related U.S. Application Data filed on Jan. 12, 2017, provisional application No. 62/349,367, filed on Jun. 13, 2016, provisional application No. 62/434,179, filed on Dec. 14, 2016.

(51) Int. Cl.

| | | |
|---|---|---|
| *G06F 15/16* | (2006.01) | |
| *H05B 1/02* | (2006.01) | |
| *H05B 6/64* | (2006.01) | |
| *G06N 99/00* | (2010.01) | |
| *G05B 19/042* | (2006.01) | |

(58) Field of Classification Search
USPC ......... 219/703, 702, 705, 707, 711.714, 715, 219/716, 718, 719; 99/325, 326
See application file for complete search history.

(56) References Cited

U.S. PATENT DOCUMENTS

| | | |
|---|---|---|
| 3,189,722 A | 6/1965 | Karl |
| 3,364,332 A | 1/1968 | Sven-Olov |
| 3,370,145 A | 2/1968 | Leo |
| 3,431,381 A | 3/1969 | Anderson |
| 3,461,260 A | 8/1969 | Bremer |
| 3,475,577 A | 10/1969 | Gerhard et al. |
| 3,521,019 A | 7/1970 | White |
| 4,171,382 A | 10/1979 | Buck |
| 4,336,434 A | 6/1982 | Miller |
| 4,539,454 A | 9/1985 | Yangas |
| 4,684,776 A | 8/1987 | Heard |
| 4,894,502 A | 1/1990 | Oh |
| 4,992,638 A | 2/1991 | Hewitt et al. |
| 5,036,172 A | 7/1991 | Kokkeler et al. |
| 5,107,086 A | 4/1992 | Yangas |
| 5,283,410 A | 2/1994 | Kim |
| 5,293,019 A | 3/1994 | Lee |
| 5,504,311 A | 4/1996 | Dubuis et al. |
| 5,519,195 A | 5/1996 | Keefer et al. |
| 5,693,247 A | 12/1997 | Bu et al. |
| 5,698,128 A | 12/1997 | Sakai et al. |
| 6,444,965 B1 | 9/2002 | Ha et al. |
| 6,501,058 B2 | 12/2002 | Jung |
| 6,674,056 B2 | 1/2004 | Lee |
| 2002/0063127 A1* | 5/2002 | Jung ................ H05B 6/688 219/703 |
| 2003/0047559 A1 | 3/2003 | Watanabe et al. |
| 2013/0041938 A1* | 2/2013 | Lin ................ G06F 3/0488 709/203 |
| 2013/0240507 A1 | 9/2013 | Kimrey |
| 2014/0208957 A1 | 7/2014 | Imai |
| 2015/0136760 A1 | 5/2015 | Lima et al. |
| 2015/0289324 A1 | 10/2015 | Rober et al. |

FOREIGN PATENT DOCUMENTS

| | | |
|---|---|---|
| CN | 2741050 | 11/2005 |
| CN | 203560960 U | 4/2014 |
| CN | 205026746 U | 2/2016 |
| GB | 2245993 A | 1/1992 |
| JP | 62322512 A | 6/1989 |
| JP | H09232072 A | 9/1997 |
| JP | 2003090540 A | 3/2003 |
| JP | 200444846 | 2/2004 |
| JP | 5273930 B2 | 8/2013 |
| JP | 201553206 | 3/2015 |
| KR | 1019970075466 | 11/2000 |
| KR | 1020020087949 | 8/2005 |
| WO | 2012073451 A1 | 6/2012 |
| WO | 2014198637 A1 | 12/2014 |
| WO | 2014132121 A9 | 4/2015 |

OTHER PUBLICATIONS

J. Sanders, Seeing the Unseen: Infrared Computer Vision Systems Could Help Make Meat Products Safer, Tastier, and Less Costly to Produce, Poultry Tech, vol. 19, No. 1, Spring 2007.

PCT International Search Report_PCT/US2017/024155_dated Jun. 26, 2017.

PCT International Search Report_PCT/US2017/024155_dated Aug. 11, 2017.

* cited by examiner

FIG. 1
100
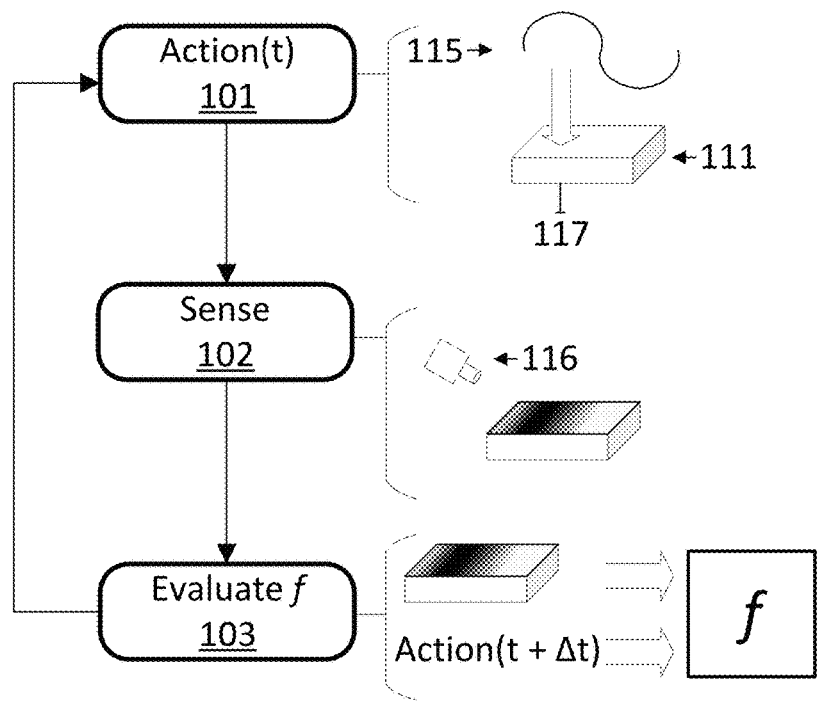
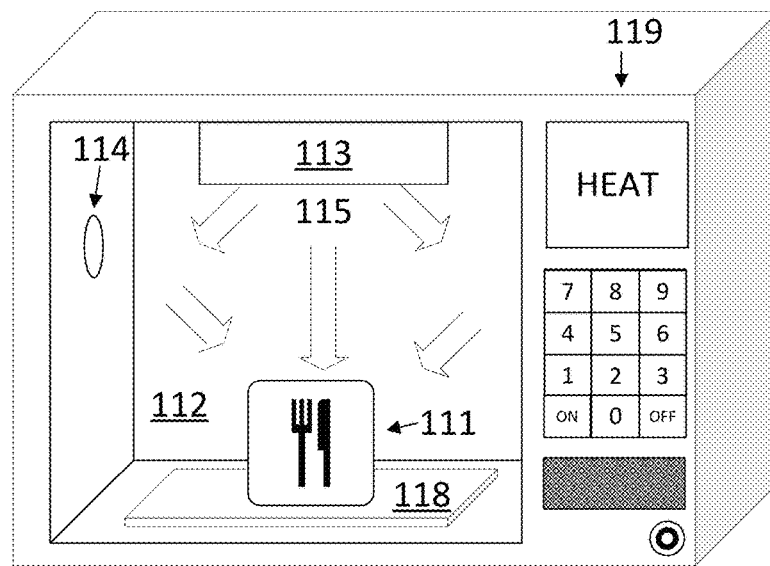

FIG. 6
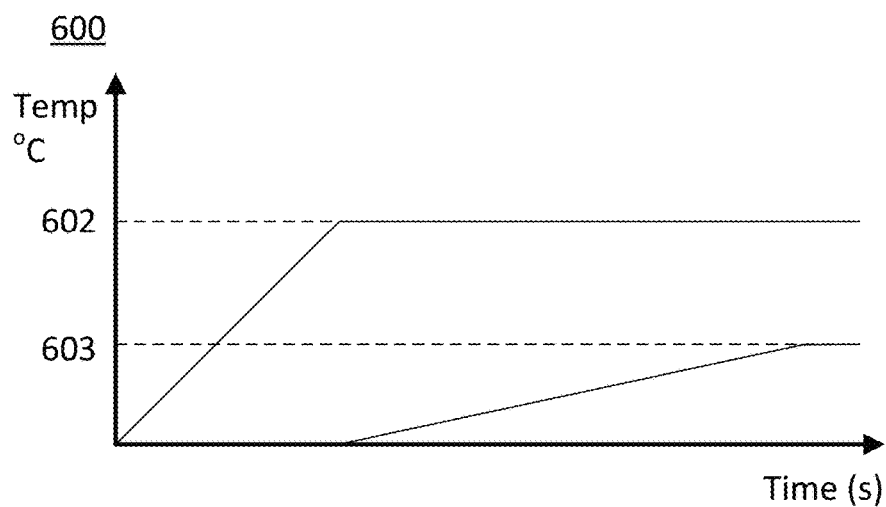
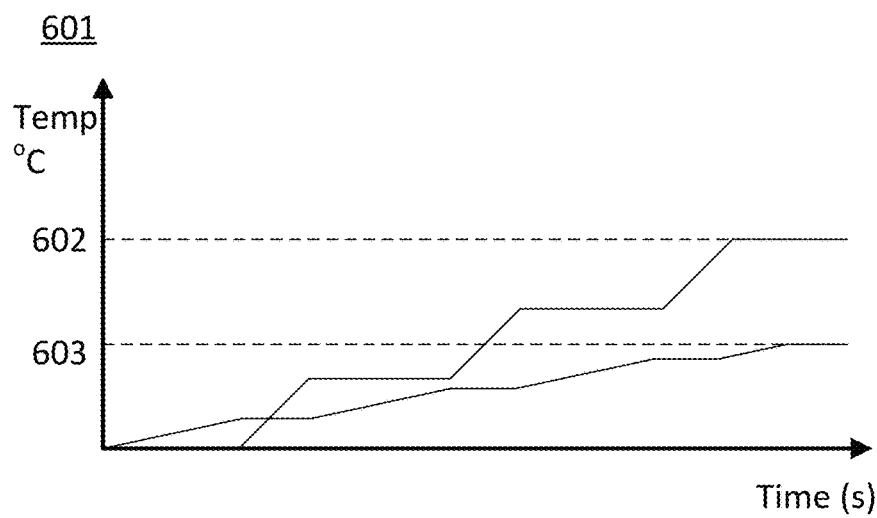

1200

1300

1400

1600

ELECTRONIC OVEN WITH INFRARED EVALUATIVE CONTROL

CROSS REFERENCE TO RELATED APPLICATIONS

This application claims the benefit of U.S. Provisional Application No. 62/315,175, filed Mar. 30, 2016, U.S. Provisional Application No. 62/445,628 filed Jan. 12, 2017, U.S. Provisional Application No. 62/349,367, filed Jun. 13, 2016, and U.S. Provisional Application No. 62/434,179, filed Dec. 14, 2016, all of which are incorporated by reference herein in their entirety for all purposes.

BACKGROUND OF THE INVENTION

Electronic ovens heat items within a chamber by bombarding them with electromagnetic radiation. In the case of microwave ovens, the radiation most often takes the form of microwaves at a frequency of either 2.45 GHz or 915 MHz. The wavelength of these forms of radiation are 12 cm and 32.8 cm respectively. The waves within the microwave oven reflect within the chamber and cause standing waves. Standing waves are caused by two waves that are in phase and traveling in opposite directions. The combined effect of the two waves is the creation of antinodes and nodes. The waves perfectly interfere at the nodes to create spots where no energy is delivered. The waves perfectly cohere at the antinodes to create spots where twice the energy of a single wave is delivered. The wavelength of the radiation is appreciable compared to the speed at which heat diffuses within an item that is being heated. As a result, electronic ovens tend to heat food unevenly compared to traditional methods.

Electronic ovens are also prone to heat food unevenly because of the mechanism by which they introduce heat to a specific volume of the item being heated. The electromagnetic waves in a microwave oven cause polarized molecules, such as water, to rotate back and forth, thereby delivering energy to the item in the form of kinetic energy. As such, pure water is heated quite effectively in a microwave, but items that do not include polarized molecules will not be as efficiently heated. This compounds the problem of uneven heating because different portions of a single item may be heated to high temperatures while other portions are not. For example, the interior of a jelly doughnut with its high sucrose content will get extremely hot while the exterior dough does not.

Traditional methods for dealing with uneven cooking in electronic ovens include moving the item that is being heated on a rotating tray and interrupting the beam of electromagnetic energy with a rotating stirrer. Both of these approaches prevent the application of an antinode of the electromagnetic waves from being applied to a specific spot on the item which would thereby prevent uneven heating. However, both approaches are essentially random in their treatment of the relative location of an antinode and the item itself. They also do not address the issue of specific items being heated unevenly in the microwave. In these approaches, the heat applied to the chamber is not adjusted based on the location, or specific internal characteristics, of the item being heated.

SUMMARY OF THE INVENTION

Approaches disclosed herein apply energy to an arbitrary item placed in a chamber for heating using evaluative feedback or deterministic planning to thereby solve the problem of uneven heating in an electronic oven. In some approaches, the evaluative feedback involves an evaluation of the item by sensing a surface temperature distribution for the item using an infrared sensor which is provided to a control system. In some approaches, the evaluative feedback involves an evaluation of the item by sensing RF parameters associated with the application of energy to the item such as an impedance match or return loss. In some approaches, the deterministic planning is conducted using an evaluation of any of the parameters discussed herein that are used for evaluative feedback. For example, the deterministic planning can be guided by an evaluation of the surface temperature distribution of the item. The evaluation of the surface temperature distribution can be conducted during a discovery phase, which is conducted ex ante to the actual execution of a plan developed by such a deterministic planner, for purposes of obtaining information that can be used to generate that plan. The evaluation of the surface temperature distribution can also be conducted during execution of the plan to determine if the actual heating of the item is not progressing in accordance with what was expected when the plan was generated.

In some approaches, the actions taken by the control system during the execution of a plan developed by deterministic planning or during the execution of an evaluative feedback loop involve applying energy to the item and altering at least one of the intensity of a source of energy for the chamber and altering the relative position of the item with respect to a variable distribution formed by that source of energy. For example, a microwave source could form a variable distribution of electromagnetic energy in a chamber and the relative position of that variable distribution to the item being heated could be adjusted. The variable distribution could include nodes and antinodes. The variable distribution may include local maxima or "hot spots" where energy is applied to a larger degree than any other adjacent location. The local maxima will have a relative position with respect to the item. The action taken by the control system could include altering the relative position from a first position value to a second position value. As used herein, the term "variable distribution" refers to a variance in a level of energy across space and not to a distribution of energy that is varying temporally.

In some approaches, evaluative feedback is used to train a control system to apply energy in an optimal manner to any item placed in the chamber. Evaluative feedback is particularly applicable to the problem of uneven heating for arbitrary items because each action taken by the control system provides training information to the control system. This is particularly beneficial in the case of training a control system to heat an item because, unlike in pure data manipulation tasks, each training episode involves an appreciable amount of time. Training a control system using a training environment that exists purely in the digital realm, such as training a control system to play chess against another digital system, can involve training episodes that last less than a millisecond. However, training a control system using a training environment that includes physical reactions taking place in the real world involves constraints set by the actual speed of those physical reactions. Therefore, evaluative feedback, which provides training information in response to each action taken by the control system, is beneficial for this particular application because more training information can be obtained in a set period of time.

Some of the approaches disclosed herein also utilize the information gleaned from the evaluative feedback to train the control system using a reinforcement learning training system. Reinforcement learning involves the use of an action-value function and an assignment of reward values to different states. The action-value function takes the state of the system and a potential action to take from that state as inputs and outputs the potential future rewards that will be obtained from taking that action. In some approaches, the state could at least partially be defined by the surface temperature distribution of the item. For example, the state could be a matrix of temperature values that correspond to physical locations across either a two dimensional plane or three dimensional volume. The two dimensional plane could be set by the location of pixels on an infrared camera or it could be the actual surface area of the item extrapolated from a visual image of the item. Reward values could be calculated using multiple inputs and could be derived from the surface temperature distribution. Rewards can be positive or negative. For example, higher rewards could be provided for keeping a variance in the surface temperature distribution low. Negative rewards could be provided for causing an item to char or spill in the chamber.

In some approaches, a plan is generated using a deterministic planner and an evaluation of certain parameters regarding the operation of the electronic oven or the item. For example, the electronic oven could evaluate a cost function to determine a plan for heating the item with a minimum cost. Evaluating the cost function could involve the utilization of information regarding a surface temperature distribution of the item in the chamber. The information could be used to extrapolate a planned surface temperature distribution for the item. For example, the surface temperature distribution of the item in response to a predefined application of energy could be used to extrapolate how the temperature distribution of the item would change in response to a planned application of energy to the item that had not yet occurred. The extrapolated distributions could then be used to evaluate the cost function associated with that planned application of energy. The information could also be used to determine if an actual surface temperature was departing from a planned surface temperature distribution in order to monitor the performance of the plan against expectations and determine if a new plan should be determined. The information could also be used to generate an estimated plan cost using a heuristic. For example, the surface temperature distribution of the item in response to a set of predefined applications of energy under a set of configurations for the electronic oven could be used to provide an estimate of how much longer an item would need to be heated to reach a target temperature.

A set of example computer-implemented methods that utilize infrared evaluative control can be described with reference to flow chart 100 and electronic oven 110 in FIG. 1. Flow chart 100 illustrates a set of computer-implemented methods for heating an item in a chamber such as item 111 in chamber 112 of electronic oven 110 using infrared evaluative control. The infrared evaluative control can involve evaluative feedback or obtaining information for a deterministic planner. The methods can be executed or administrated by a control system in electronic oven 110. The electronic oven can include a microwave energy source 113 and a discontinuity 114 in the chamber wall. Microwave energy source 113 can produce a distribution of energy 115 in the chamber. Discontinuity 114 can allow an infrared sensor 116 to sense a surface temperature distribution of the item. Sensor 116 could be coupled to discontinuity 114 via a waveguide or some other means of coupling the infrared energy to the sensor.

In step 101, the control system of electronic oven 110 takes a first action. The action is illustrated as being conducted at time t. The first action alters at least one of a relative position of and an intensity of the distribution of energy 115 in chamber 112 from microwave energy source 113. The relative position of distribution of energy 115 is defined relative to item 111. Distribution 115 can be caused by the standing wave pattern of microwave energy source 113 as applied to the chamber. Distribution 115 can also be caused by the targeted application of energy to the item. An example variable distribution 115 is illustrated as being applied to item 111. Variable distribution 115 includes a local maxima aligned with item 111 at point 117.

In step 102, a surface temperature distribution for the item is sensed using an infrared sensor. The infrared sensor could be infrared sensor 116 capturing infrared radiation from item 111. Step 102 could alternatively or additionally involve sensing RF parameters associated with the delivery of energy to item 111. In this case, some aspects of step 102 could be conducted simultaneously with step 101. However, step 102 could also be conducted after the electronic oven completed the execution of the action in step 101. For example, in the specific case of the surface temperature distribution being measured during a discovery phase of the overall heating process, the action in step 101 could be the provisioning of energy to the item, and the sensing in step 102 could be conducted to measure the response of the item in the immediate aftermath of the energy delivery.

In step 103, the control system of the electronic oven will evaluate a function to generate a function output. Information derived from the surface temperature distribution sensed in step 102 and at least one potential action for the electronic oven to take can be used to evaluate the function. The potential action is labeled t+Δt to indicate that it is an action that will be taken in a proximate time step. The loop back from step 103 to step 101 is indicative of a time step in which time is incremented by Δt and the next action is executed. During this second iteration of step 101, the control system of the electronic oven will take a second action. The second action will alter at least one of the relative position and the intensity of the distribution of energy in the chamber from the microwave energy source. The second action is selected from a set of potential actions based on the function output. As will be described below, the second action can be the next action taken by the control system in accordance with an evaluative feedback loop or it can be an action taken at a later time as part of a sequence of actions in accordance with a plan. The plan could be determined by a deterministic planner or by an optimization analysis conducted in step 103.

The function could be an action-value function F(s,a) with a reward value serving as the function output. The reward value could be a reward associated with taking action "a" from state "s." The information derived from the surface temperature distribution could be the state value "s" for the function. The next action the electronic oven would take could then be the second input "a" to the action-value function. This approach could be used in combination with an evaluative feedback or reinforcement learning approach as described below.

The function could alternatively by a cost function F(n) with a cost value serving as the function output. The cost value could be a plan cost associated with executing a plan to heat the item based on an evaluation conducted at node "n." The node can be defined by a sequence of actions that the electronic oven is capable of executing. One of the actions in that sequence of actions is the potential action utilized to evaluate the function. The plan cost can be associated with a traversed plan cost resulting from the execution of that sequence of actions. The node could also be associated with an extrapolated state of the item provided by an extrapolation engine. The node could also be associated with an estimated future plan cost provided by a heuristic. The information derived from the surface temperature distribution could be used by the extrapolation engine to extrapolate the extrapolated state. The information derived from the surface temperature distribution could also be used to determine if a deviation has occurred from the extrapolated effect of the plan. For example, an extrapolated surface temperature distribution that was expected to result from a sequence of actions could be compared against an actual surface temperature distribution that was sensed after the actual execution of those actions. The evaluation could be conducted by a deviation detector. Upon detecting a deviation, the control system could abandon the original plan and generate a new plan. These approaches could be used in combination with a deterministic planner approach as described below.

The function could alternatively be executed by an optimization analysis solver. The optimization analysis could determine if it was possible to produce a plan to heat the item to a target state within an acceptable error value (i.e., tolerance). The analysis could be conducted using the data obtained from a sensor during the execution of a previous action. For example, the data could be collected in sensing step 102 and define a response of the item to an action conducted in step 101. The optimization analysis could then determine if previously conducted actions, for which a response was known through the obtained sensor data, could be repeated in a particular sequence to bring the item from a current state to a target state. The optimization analysis could use a convex optimization solver. The output of the optimization analysis could be used to directly derive a plan to heat the item. In that case, the actions conducted in future iterations of step 101 could involve the execution of actions specified by the plan. Such an optimization analysis could, also or alternatively, be used as the extrapolation engine or heuristic described above and thereby as part the plan generation process of a deterministic planner.

Some of the approaches disclosed herein involve an alteration to a control or training system based on the identity of the item placed in the chamber or a particular kind of heating selected by a user. In particular, the action-value function, cost function, heuristic, extrapolation engine, deviation detector, state characteristics, reward derivation procedure, optimization analysis, or training system for a reinforcement learning approach mentioned herein could be altered based on the identity of the item or commands from the user. For example, the cost function and reward derivation procedure could both be altered if an item was known to recovery slowly from major temperature disparities such that keeping an even temperature was associated with greater rewards and lower costs. As another example, the tolerance for the optimization analysis could be decreased if the item was recognized as one that dried out rapidly or charred if a target temperature was exceeded for a short period of time.

In these approaches, information concerning the identity of the item can be provided by various channels to assist the operation of the control and training systems. The channels can include a QR code or UPC barcode located on a package of the item. Another channel could be a response to the item to a given calibration step such as a monitored response of the item to an application of energy as monitored by an infrared sensor. Another channel could be a separate machine learning algorithm such as a traditional neural network trained to work as a classification system to identify items in the chamber as specific food items. Another channel could be the visible light reflected off the item and detected by a visible light sensor. Another channel could be an input from a user of the electronic oven via a user interface. The information provided via these channels could simply identify the item and allow the controls system to determine how to alter itself, or the information could actually be directly applied to change the control system. For example, a QR code could identify an item as a frozen dinner, and the control system could load a new reward derivation procedure based on the identification information, or the information in the QR could itself be a new reward derivation procedure. For example, the reward derivation procedure could reward a gradual phase change in the item from frozen to melted.

Some of the approaches disclosed herein require the definition of a target state in order for an associated planner or reinforcement learning system to function. The target state can be received from a user of the electronic oven at varying degrees of specificity. For example, the user could specify a specific temperature for the item or a set of different temperatures for sub-items. Alternatively, the user could specify a general command such as "warm" or "boil" and the target state could be derived from that command. The target state could be defined by a temperature distribution across the surface of the item or throughout the volume of the item. In some approaches, the electronic oven will intuit the target state from context such as an identity of the item, prior inputs received from the user, and other external factors such as the location of the electronic oven and the time of day.

The disclosed approaches improve the fields of electronic ovens and microwave heating by providing more reliable heating. Controlling the application of electromagnetic energy to an item in a controlled and reliable manner is a technical problem. The disclosed approaches include a set of aspects that contribute to a solution to that technical problem. In particular, the use of evaluative feedback, optimization analyses, deterministic planners, and reinforcement learning as described herein each enhance the accuracy and efficiency of a control system for heating an item in an electronic oven in an inventive manner to solve the aforementioned technical problem and improve the operation of electronic ovens generally.

BRIEF DESCRIPTION OF THE DRAWINGS

FIG. 1 includes a flow chart for a set of computer-implemented methods for heating an item in a chamber using an evaluative control system and an illustration of an electronic oven in accordance with approaches disclosed herein.

FIG. 6 includes two sets of axes that chart two plans derived from a single duration vector in accordance with approaches disclosed herein where the x-axis of both sets of axes is time in units of seconds and the y-axis of both sets of axes is temperature in units of degrees Celsius.

DETAILED DESCRIPTION OF THE EMBODIMENTS

Figure 2:
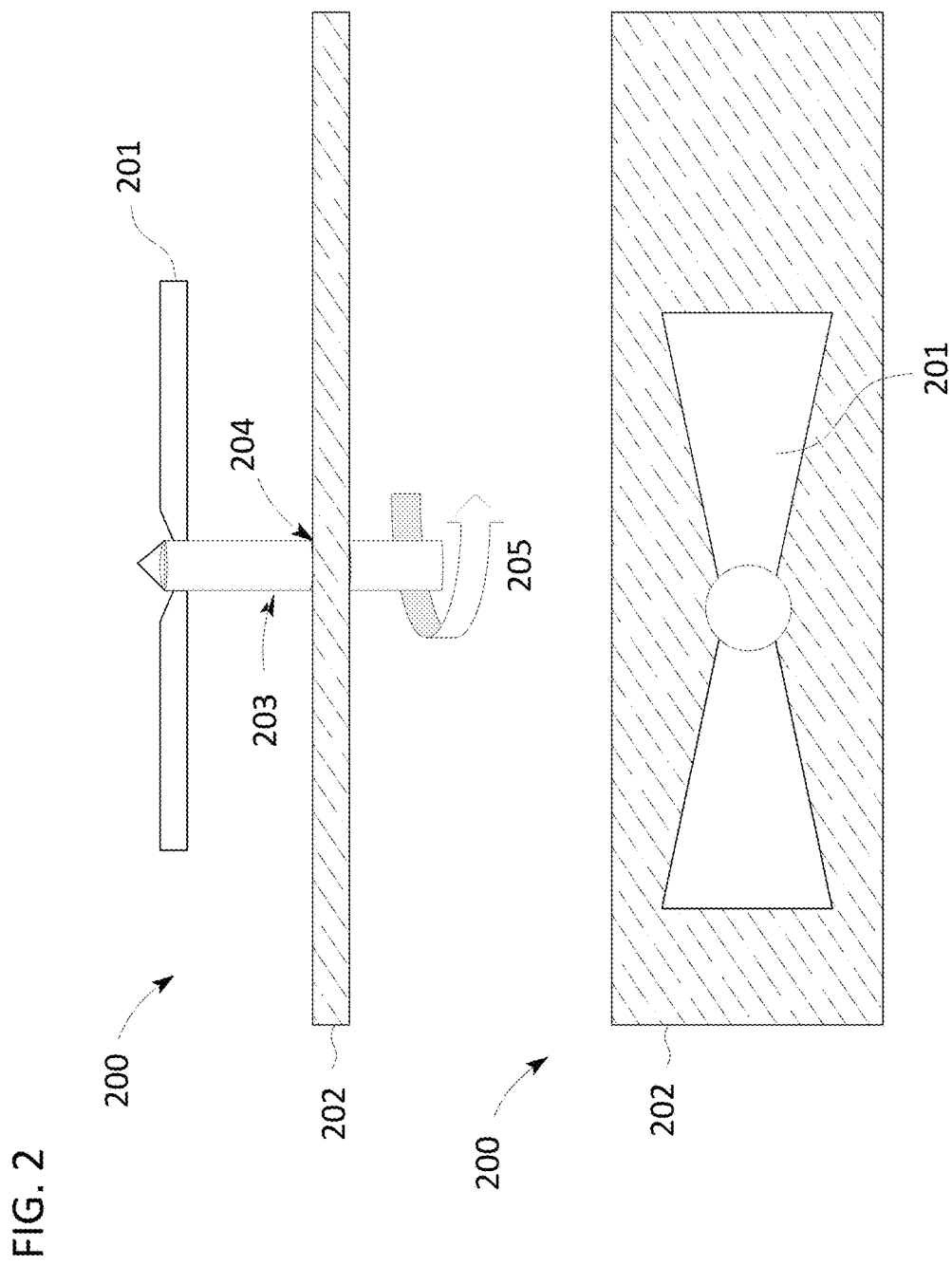
FIG. 2 includes a plan view and side view of a reflective element for altering a distribution of energy in the chamber of an electronic oven in accordance with approaches disclosed herein.

Control systems that use evaluative control to heat an item in a chamber of an electronic oven are disclosed. In some approaches the control systems use evaluative feedback. The output of the control system can include a power level and a relative position of a variable distribution of electromagnetic energy applied to a chamber of the oven with respect to an item in the chamber. The feedback to the control system can comprise visual light data, a surface temperature distribution of the item, or RF parameters associated with the absorption of electromagnetic energy by the chamber or item. In some approaches, the evaluative feedback is used to train the control system using a reinforcement learning training system. In some approaches, the control system generates a plan using a deterministic planner to heat the item. In some approaches, the evaluative feedback is used to learn the response of the item to a given action. The pairs of responses and actions can then be used to derive a plan to heat the item to a target state. The plan can include a sequence of actions that change the power level and variable distribution for the pattern of electromagnetic energy applied to the chamber relative to an item in the chamber. The plan can be generated based on an evaluation of a surface temperature distribution of the item during a discovery phase of the overall heating process and an extrapolation of how the surface temperature distribution would alter in response to additional actions taken by the electronic oven. The performance of a plan can be monitored based on an evaluation of a surface temperature distribution of the item, or other feedback parameter, during execution of the plan.

Electronic Oven Components

Electronic oven 110 in FIG. 1 illustrates various features of an electronic oven that can be used in accordance with approaches disclosed herein. The oven opening is not illustrated in order to reveal chamber 112 in which item 111 is placed to be heated. Item 111 is bombarded by electromagnetic waves via a variable distribution of energy 115 from an energy source 113. The item can be placed on a tray 118. Electronic oven 110 includes a control panel 119. The control panel 119 is connected to a control system located within oven 110 but outside chamber 112. The control system can include a processor, ASIC, or other embedded system core, and can be located on a printed circuit board or other substrate. The control system can also have access to firmware or a nonvolatile memory such as flash or ROM to store instructions for executing the methods described herein.

Energy source 113 can be a source of electromagnetic energy. The source could include a single wave guide or antenna. The source could include an array of antennas. The electromagnetic waves can be microwaves. The electronic oven 110 can include a cavity magnetron that produces microwaves from direct current power. The microwaves could have a frequency of 2.45 GHz or 915 MHz. The cavity magnetron can be powered by modern inverter microwave technology such that microwaves can be produced at varying power levels. However, traditional power conditioning technology can be used to produce a set level of direct current power for the magnetron. The electromagnetic waves could be radio frequency waves generally. The frequency of the waves could also be alterable by energy source 113. Energy source 113 could also be configured to produce multiple wave patterns with different frequencies simultaneously.

Microwave 110 can form a variable distribution 115 in chamber 112 with antinodes and nodes formed at different three dimensional points within the volume defined by chamber 112. A particular physical configuration for the variable distribution within chamber 112 can be referred to as a mode of the electronic oven. The relative distribution of energy in the chamber can be altered by altering the mode of the electronic oven while keeping item 111 stationary, or by moving item 111 within the chamber. The energy source 113 can include a mode stirrer to prevent the formation of standing waves in fixed positions within chamber 112. The mode stirrer can be a collection of protrusions placed in such a way as to partially obstruct the electromagnetic energy being applied to chamber 112, and to alter the manner in which the energy is obstructed to cause varying degrees of reflection and alter the pattern of antinodes and nodes formed in chamber 112. In situations where the energy source 113 is an array of antennas, the energy source could instantaneously deliver variable levels of energy to the antennas in the array to alter the variable distribution within chamber 112.

Control panel 119 can be used to communicate with the user. The control panel 119 is used to provide information to the user, receive commands from the user, or both. Control panel 119 is shown with an optional display, keypad, speaker, and camera. The control panel could display information on the display. The display could be touch enabled and receive commands from the user via a touch controller. The control panel could provide audio prompts via the speaker and receive voice commands from the user via an integrated microphone. Depending on the sophistication of the voice system, the speaker can also be used to carry out a basic dialog with the user to guide them in the entry of voice commands to the electronic oven. The control panel could receive commands from the user via the keypad. Although a basic set of keys are presented in FIG. 1, the electronic oven could have any number of specialized keys for inputting commands specific to certain functionalities of electronic ovens disclosed herein. The control panel could receive gesture commands from the user via the camera or through an alternate ultrasound or ultraviolet sensor. The control panel could receive information from UPC or bar codes from the packaging of items before they are placed in chamber 112 via the camera. The camera can also be configured to recognize items placed into the field of view of the camera using traditional classifier and image recognition techniques.

Electronic oven 110 could also include one or more connections to a wired or wireless communication system. For example, the oven could include a radio for a satellite or Wi-Fi connection. The control system for electronic oven 110 could include a web browser or simple HTTP client for communicating over the Internet via that radio. The wireless communication system and control system could also be configured to communicate over a LAN or PAN such as through the use of Bluetooth, Zigbee, Z-wave or a similar standard. The radio could also be configured to conduct inductive communication with RFID tags placed on the packaging of items to be heated. The inductive communication could be NFC communication.

The electronic oven could communicate via any of the aforementioned means to a central server administrated by or on behalf of the manufacturer of electronic oven 110 to receive updates and provide information on the machine's operation. All of the functionality provided by control panel 119 can be provided by a separate consumer device such as a mobile telephone or web portal on a workstation via any of the aforementioned means. Communication could include providing status information from the oven to the device or commands from the device to the oven. Additional functionality may be provided given the potential for the device and oven to be in separate places (e.g., more frequent status updates or a visible light image of what is in the chamber).

Electronic oven 110 can also include a discontinuity in the walls of chamber 112 that is configured to allow electromagnetic radiation to channel out of the chamber. The discontinuity could be an opening 114. Although opening 114 in the electronic oven is shown on a wall of chamber 112, the opening can be located anywhere on the surface of chamber 112 which provides a sufficient view of the interior of chamber 112. The opening could comprise a past cutoff waveguide with physical parameters set to block the electromagnetic energy from energy source 113 while allowing electromagnetic energy in other spectrums to escape through opening 114. For example, microwave energy could be prevented from exiting the opening while visible light and infrared energy were allowed to pass through opening 114.

Opening 114 could channel the energy from chamber 112 either directly or through a waveguide, to a sensor. The sensor could be configured to detect infrared energy or visible light, or a combination of the two. The sensor or set of sensors could include an IR camera, a visible light camera, a thermopile, or any other sensor capable of obtaining visible light sensor data and/or infrared light sensor data. In a specific example, the opening could be connected to a standard visible light camera with an IR filter removed in order for the camera to act as both a visible light sensor and an infrared sensor and receive both infrared sensor data and visible light sensor data. A single sensor approach would provide certain benefits in that an error in the alignment of two different fields of view would not need to be cancelled out as could be the case with a two sensor system.

The same opening could be used to channel both visible and infrared light out of the chamber. In one approach, a time multiplexed filtering system, which could be used additionally or in the alternative to the past cutoff waveguide, could allow a single sensor, or multiple sensors, to detect both visible light and infrared energy from the same stream of electromagnetic energy. The filter could comprise a wheel, or other selector, with filters for different spectra of electromagnetic energy. The wheel would be placed in line with the stream of electromagnetic energy and alternatively transmit solely the visible light or infrared energy. A sensor, or sensors, placed on the alternative side of the wheel would then be able to detect the desired light from the incoming stream. The sensor could also be configured to obtain information regarding both spectra and resolve the signal into its infrared and visible light component part using digital filtering. In another approach, the sensors could be configured to continuously obtain different segments of the same stream of electromagnetic energy by, for example, being positioned at slightly different angles with respect to an opening om the chamber.

An example electronic oven can also include additional openings in order to obtain different views of item 111. Data from the various views could then be combined to form a three-dimensional image of the item. However, a camera applied to sense visible light through opening 114 could alternatively be a three-dimensional camera to achieve a similar result. In particular, two openings can be utilized with two cameras to obtain stereoscopic information regarding item 111. As another particular example, the two openings could be used to obtain different streams of data (e.g., opening 114 could obtain a stream of visible light sensor data while another opening obtained a stream of infrared light sensor data).

An example electronic oven in accordance with this disclosure could include other features not illustrated in FIG. 1. The oven could be augmented with numerous additional sensors. The sensors could include temperature sensors, auditory sensors, RF parameter sensors, humidity sensors, particulate concentration sensors, altitude sensors, ultrasound sensors, ultraviolet or IR sensors, a weight sensor such as a scale, and any other sensors that can be used to obtain information regarding the state of the item, chamber, or oven. For example, the oven could include sensors to detect the power applied to chamber 112 via source 113, the return loss from chamber 112, an impedance match between the energy source and item or chamber, and other physical aspects of the energy source. In particular, the return loss can be measured to determine a phase change in item 111 as certain items absorb energy at a much greater degree when they are melted compared to when they are frozen. Impedance matching or return loss measurements could also be applied to detect more subtle changes in the physical characteristics of the item being heated. Additional sensors could detect the humidity of the air exiting chamber 112 via a ventilation system or within the chamber. Additional sensors could detect a particulate concentration within those volumes to determine if the items were smoking. Additional sensors could detect the weight of item 111.

Electronic oven 110 can include a transparent cover to place over item 111 to prevent splattering within chamber 112 as item 111 is heated. The cover could be transparent to both visible light and to infrared light so as to not interfere with the sensing of electromagnetic radiation in those frequency bands via opening 114. For example, the cover could be infrared transmitting plexiglass. The cover could also be treated to prevent the formation of condensation by coating the material in a hydrophobic layer or by creating perforations in the cover to allow moisture to escape the enclosure.

A specific class of approaches for modifying the variable distribution of energy in the chamber involves applying energy from an energy source to a set of variable reflectance elements. The reflectance of the elements can be altered to introduce a different phase shift to incident electromagnetic waves from the energy source. Examples of such approaches are described in U.S. Patent Application No. 62/434,179, filed Dec. 14, 2016, and entitled "Electronic Oven with Reflective Energy Steering," and 62/349,367, filed Jun. 13, 2016, and entitled "Electronic Oven with Reflective Beam Steering Array," both of which are incorporated by reference herein in their entirety for all purposes. The states of the variable reflectance elements, and the state of the energy source, can define different configurations for the electronic oven. The configurations can each be associated with a different mode or variable distribution of energy in the chamber. As such, the different configurations will result in a different distribution of energy being applied to an item in the chamber. Selecting from among the different configurations will therefore result in different heating patterns for the item and can allow the oven to heat different portions of the item differently or to more uniformly heat the item as desired.

The different configurations are defined by different associated variable distributions of energy being produced within the chamber. However, the configurations do not necessarily require the electronic oven itself to take on different physical configurations. In some approaches, the state of the variable reflectance elements and the energy source can be altered without the electronic oven utilizing any moving parts. For example, the variable reflectance elements and energy source could each solely comprise solid state devices, and the configuration of the oven could be set by providing different signals to those solid state devices. However, in other approaches, the configurations will involve different physical configurations for the electronic oven. For example, the variable distribution of energy in the chamber can be altered by independently altering the physical position of variable reflectance elements in a set of variable reflectance elements as described with reference to FIG. 2.

The electromagnetic waves applied to the chamber, such as from microwave source 113, can be a polarized or partially polarized electromagnetic wave. Therefore, by altering the orientation of a variable reflectance element upon which the electromagnetic wave is incident, the distribution of energy in the chamber can be altered. In particular, the position of the reflective elements can be altered to adjust the orientation of the reflective element with respect to the dominant polarization of an electromagnetic wave in the chamber. For example, the phase shift introduced by each variable reflectance element could be alternately changed in a binary fashion from 0° to 90° and back, or could be altered in an analog fashion anywhere from 0° to 180° with a smooth transition between each gradation on the spectrum. As a more specific example, the orientation of each variable reflectance element with respect to the dominant polarization of an incident electromagnetic wave could be changed from 0° to 90° and back, or could be anywhere from 0° to 180° with a smooth transition between each orientation. Notably, even in the binary case, the variable reflectance element may be just a single element in a large set, such that a large degree of flexibility can still be provided to the control system despite the fact that each individual element only has two states.

FIG. 2 illustrates a variable reflectance element 200 both from a side view (top image of FIG. 2) and plan view (bottom image of FIG. 2). Element 200 alters a variable distribution of energy in the chamber by altering its physical position from a first position to a second position. Element 200 includes a reflective element 201 which in this case is a relatively flat piece of conductive material that could be formed of sheet metal such as aluminum, steel, or copper. The reflective element 201 is held above a surface of the chamber, defined by chamber wall 202, by a dielectric axle 203 that extends through a discontinuity 204 in the chamber wall. The axle is dielectric, passes through a small perforation, and is generally configured to avoid creating an antenna for microwave energy to leak out of the chamber.

A motor on the exterior of the chamber is able to rotate reflective element 201 via dielectric axle 203 by imparting a force to the axle as illustrated by arrow 205. The force could be applied by a rotor attached to axle 203. The entire structure illustrated in FIG. 2 could be sealed behind a false wall of the chamber to shield the structure from stains or mechanical damage. The motor is able to rotate the axle between a set of positions selected from a fixed set of positions. For example, the motor could adjust the axle so that the reflective element 201 was rotated back and forth through a 90° arc. However, the motor could also rotate the reflective element through any number of fixed steps along an entire 360° degree arc.

Many of the approaches described above exhibit the feature of the electronic oven being capable of being placed in multiple configurations while the control system keeps track of which configuration the electronic oven is in with precision. In contrast to the operation paradigm of traditional mode stirrers and similar devices in which the control system is unaware of the current state of the electronic oven, the disclosed approaches allow the control system to independently alter the state of multiple elements and set the state of the oven with particularity. This allows the control system to effectively execute many of the control approaches described below because the electronic oven has numerous states available to it, and can observe with specificity the response of the item to a particular application of energy in those particular states.

Evaluative Feedback—Heuristic Optimization Control

The response of an item in the chamber to a given action can be sensed, evaluated, and stored as a description of how the item responded to that action. These steps can be repeated to form a library of descriptions of how the item responds to various actions. The library of descriptions can then be utilized to develop a plan for heating the item from a current state to a target state. The plan can be developed automatically by the control system using an optimization analysis that selects actions from the library to drive the item from a current state towards a target state subject to various constraints. The control system can also determine if there is no plan capable of reaching the target state within a given set of constraints with the level of information currently known. At that point, the optimization system can indicate the need to obtain another description of how the item responds to an additional action.

The approach outlined in the previous paragraph will not always provide an accurate description of how the state of the item will change through the application of various actions. This is because the system is generally not time invariant. The execution of an action upon an item during a heating task tends to change the item, sometimes dramatically, and tends to alter the response the item will experience when such an action is repeated. In a basic example, an observation of how a cube of ice response to a blast of heat will be different than an observation of how that item responds to the same blast of heat when it has already melted because the different phase of the item cause the item to exhibit different heat specificity. As a result, plans generated using the descriptions in the library will be more accurate in the near term as the characteristics of the item have not changed to an appreciable degree from when the response was sensed and recorded.

Given the time variant nature of the analyses described in this section, the analyses can be considered methods for developing a heuristic description of how the item will respond to a heating plan. However, the analyses can be performed with relatively little time and resources as compared to other machine intelligence techniques. Therefore, the analyses can be run with relatively high frequency compared to the actual execution of actions by the electronic oven, and variations from the state expected by the original estimate can be continuously corrected for. In effect, the control system: (i) can operate using plans produced by analyses, which are likely to be at least somewhat accurate in the near term; and (ii) can be continuously producing updated plans through additional iterations of the analyses, which replaced prior plans as the accuracy of those prior plans begin to decline. These additional iterations will assure that the expected and actual performance of each plan does not diverge to an unacceptable degree. The control system can also be updated to reflect differences in how the item responds to a given action by discarding previously stored responses in the library so that the optimization analyses operates on updated information regarding the response of the item.

The frequency at which the additional iterations of the analysis is conducted should be controlled to assure that the accuracy of the plan that is currently being executed is maintained while at the same time allowing the effect of a given plan to be sensed and registered by the control system. Given a system in which the execution of each action is on the order of seconds, including the overhead associated with transitioning between configurations, and given that the accuracy of the heuristic's prediction tends to fall off on the order of tens of seconds, the period between additional iterations of the analyses should be greater than 3 seconds and less than 15 seconds.

A set of computer-implemented methods for heating an item in a chamber of an electronic oven towards a target state can be described with reference to flow chart 300 in FIG. 3. Flow chart 300 includes step 301 of heating the item with a set of applications of energy to the chamber while the electronic oven is in a respective set of configurations. The applications of energy and the respective set of configurations define a respective set of variable distributions of energy in the chamber relative to the item in the chamber. The variable distributions of energy are referred to as being variable because the level of energy through the physical space of the chamber is variable, not because the distributions vary temporally. A given variable distribution of energy relative to the item must be maintained for enough time for the system to detect a response that is directly attributable to that variable distribution. The configurations can involve varying the manner in which energy is directed from the energy source to the item, a relative position of the item with respect to the chamber, and a physical configuration of the electronic oven itself. In keeping with FIG. 2, the different configurations could be distinguished by rotating one or more variable reflectance elements in a set of variable reflectance elements (i.e., variable reflectance element 200 could be rotated 90° to transition from one configuration to another).

Step 302 involves sensing sensor data that defines a respective set of responses by the item to the set of applications of energy. The set of applications of energy are distinct variable distributions of energy in the chamber relative to the item as caused by different configurations of the electronic oven and applications of energy to the chamber. The sensor can be an infrared sensor, or any of the sensors described herein. The responses are respective in that each response defines the response of the item to a specific, respective, application of energy and configuration of the electronic oven. The respective responses, applications of energy, and configurations are combined to make a set of entries in the library of responses described above. The configurations can be different physical configurations of the electronic oven. For example, a first response could be "temperature increased 2 degrees F." and correspond to a respective application of energy "50%" and a respective physical configuration "nominal," while a second response could be "temperature increased 5 degrees F." and correspond to a respective application of energy "100%" and a respective physical configuration "tray rotated 30 degrees." The configurations can be greatly varied based on the complexity of the electronic oven. For example, a large vector of different rotation values could be required to describe the configuration of an electronic oven having a large array of elements similar to reflective element 200 in FIG. 2.

The duration of each application of energy and the commensurate time in which the electronic oven is in a given configuration must be controlled to assure that the control system is able to accurately attribute a given set of sensor data with a particular variable distribution of energy in the chamber relative to the item. If the configurations change too rapidly, there is no way to assure that the recorded sensor data is an accurate representation of how the item responded to that configuration. Specifically, the sensor data obtained in step 302 should correspond to a known application of energy and a known configuration so that a repetition of the associated variable distribution of energy in the chamber relative to the item at a later time will produce a known result when the plan is executed. However, the sensor data may or may not be collected simultaneously with the application of energy. Indeed, in certain applications, the sensor data will be collected immediately after the application of energy. Regardless, the duration of application should be selected to allow the library to store the sensor data in association with data representing the variable distribution of energy in the chamber relative to the item.

The duration for each application of energy and associated configuration depends in part on how fast the electronic oven can shift between configurations. This factor is important for implementations that utilize different physical configurations. In certain approaches, this requirement is met by assuring that the chamber remains wholly motionless during each application of energy. For example, if the chamber includes a set of variable reflectance elements that are physically adjusted to alter the variable distribution of energy in the chamber relative to the item, the elements remain motionless during the application of energy. Here, the chamber is defined as the region of material in which electromagnetic energy reflects to define the mode of the electronic oven (e.g., false walls that are transparent to electromagnetic energy do not define the chamber area that must remain motionless). Furthermore, in situations in which the configurations are physical configurations, and energy is being continuously supplied to the chamber, each corresponding application of energy should be at least 0.5 seconds in duration to allow the electronic oven to transition from a prior configuration, and exhibit an independently measurable response on the item. This estimate assumes an ability of the electronic oven to transfer between configurations in 0.1 seconds or less, and the duration of each application of energy should be increased in lock step with the time it takes to shifting between configurations if doing so takes longer than 0.1 seconds. The different applications of energy could be part of a continuous application of a uniform amount of energy so long as each individual application of energy was independently attributable to a respective configuration of the electronic oven and corresponding response.

Steps 301 and 302 can be conducted during a discovery phase that is intended to discover information before the actual execution of a plan. However, steps 301 and 302 can also be conducted as part of the execution of a previously generated plan. In addition, steps 301 and 302 can involve an additional discovery phase conducted after a plan has been partially executed. The benefit of a discovery process is that it may be easier to analyze the response of the item to a specific application of energy and configuration since it can be analyzed in isolation as opposed to being conducted in sequence with other steps in a plan. For example, the electronic oven could be placed in a given configuration and allowed to settle before applying an application of energy. As a result, the response sensed in step 302 will be an accurate description of how the item responded to that particular application of energy without second order effects caused by subsequent or proximate applications of energy.

An additional benefit of conducting the sensing during a discovery phase, is that it will obtain information that may already be needed for the electronic oven to provide certain functionality. For example, if the sensing for step 302 is conducted during a discovery phase, the same sensor data could be used to identify the item and could optionally be used to segment the item. In particular, the identity of the item could be determined using a classifier operating on data reflecting the response of the item to a given application of heat. As different items respond to an application of heat differently and different classes of items responds similarly, a classifier can be trained on this data to identify an item. Therefore, the same process to identify an item can be used to collect data to develop a plan to heat the item to a target state.

Segment step 303 comprises segmenting the item into a set of segments. The segments can be used to guide the generation of the plan in step 304 and measure the responses obtained in step 302. To this end, the electronic oven can be augmented with image processing systems that allow the control system to keep track of the actual physical location of the segments regardless of whether the item is moved within the chamber. This functionality can be aided by any of the means of sensing visible light disclosed herein. The number of segments can be tailored in light of the fact that a large number of segments will increase the computational complexity and resource consumption required to carry out steps 302 and 304, while a small number of segments might not provide sufficient information for assuring that the item is heated evenly as required. The segments can each be defined by a center point and an area. The center point can be referred to as a point of interest on the item.

The number of segments, location of center points, and areas of the segments can all be set properties of the control system, or could be adjusted based on the characteristics of the item in the chamber. For example, items with large heat resistivity could be identified and the identity of the item could be used to set the number of points of interest high and the areas of the segments low. This approach likewise benefits from the fact that the same data can be used to segment the item as to identify the item because there is no overhead in terms of physical actions that must be conducted by the electronic oven to obtain this information.

The different segments can be drawn to points of interest on the item in numerous ways. The segments can be set by a physical location in the electronic oven where different locations for the segments are identified according to a uniform pattern across the chamber. For example, segment 1 could be a square inch of the bottom of the chamber in the back left corner etc. However, the location of the segments can also be guided to only track portions of the item added to the chamber. For example, portions of the chamber that don't respond to the application of energy during a discovery phase can be ignored while regions that did respond could be identified as portions of the item in the chamber and selected as segments.

The segments can be set to cover a set area around a given point of interest, or they can encapsulate areas with varying size. For example, the segments could be configured to cover areas of the item that exhibit a similar response to heat. Sensor data collected in step 302 could indicate that the item actually included three different sub-items that respond to temperature in three distinct ways. In this example, the electronic oven could be discovering that the item has three sub-items corresponding to a meal of protein, vegetable, and starch. The sub-items could then be used as a basis for segmentation in which each sub-item was treated as a segment or collection of segments.

Step 303 is drawn with phantom lines in a feedback loop from step 302 because the segmenting step does not necessarily have to be conducted using an evaluation of sensor data conducted during execution of the plan. Instead, the segmentation step can be conducted prior to step 301 using a classifier and visual light data, user input, or any other channel for information from an external source to the electronic oven described elsewhere. For example, a user could directly provide input to a control system of the electronic oven to manually segment the item.

In step 304, a plan is generated to heat the item in the chamber. The generating is conducted by the control system of the electronic oven and utilizes the sensor data obtained in step 302. The sensor data can be used in the sense that responses from the library, as obtained from the sensor data, are analyzed and pieced together to create a plan for going from a current state to a target state. The pieced together responses that lead from the current state to the target state end up forming the plan because the responses are stored in the library along with the applications of energy and configurations of the electronic oven that produced those responses. Therefore, the plan will be a sequence of commands that place the oven in those configurations and applies those applications of energy. The responses from the library can be selected using an optimization analysis. Multiple copies of each response can be selected to make a single plan.

The responses selected from the library can be sequenced using the optimization analysis, or can be sequenced using a separate process. As such, the generation of the plan in step 304 can involve two steps of: conducting an optimization analysis to produce an optimization output 305, and compiling a sequence of commands using the optimization output 306. The optimization output can include an error value and a vector. The error value can be a scalar temperature value in degrees Celsius indicating an expected deviation in temperature between an expected final state and the target state. The vector can describe the responses, and the associated variable distributions of energy in the chamber relative to the item, that will be utilized to generate a plan for heating the item. The sequence of commands compiled in step 306 can define an order for applying different variable distributions of energy relative to the item to the chamber. To this end, the commands can control the applications of energy to the item and alter the configuration of the electronic oven. The electronic oven can then execute the sequence of commands to heat the item towards the target state.

An evaluation of an error value generated in step 305 can be utilized determine if additional entries for the library need to be obtained, or if the system should proceed with the execution of a plan. For example, if the error value exceeds an acceptable error value, the process can return to step 301 to obtain more response data and execute an additional iteration of step 304. In addition, the process can skip step 306 upon detecting that the error value exceeds an acceptable error value. The illustrated process in FIG. 3 is also general enough to include a loop back to step 301 even if the error value does not exceed an acceptable error value, as additional iterations of steps 301 and/or 302 can be conducted while the electronic oven is executing a plan that is associated with an acceptable error value (i.e., a plan that is expected to perform within an acceptable tolerance).

Step 305 can involve the use of a solver, data representing the target state, and data representing the set of responses obtained in step 302. Data representing the target state can be obtained from a user, be automatically generated by the control system, or be received via an external channel. The data representing the set of responses can be taken from the library, as stored in combination with data representing the variable distribution of energy in the chamber relative to the item that caused those responses. The data representing the set of responses and data representing the target state can be a set of temperature values or a set of temperature derivatives. The data can include multiple data points to represent multiple segments of the item. The data could correspond to the surface temperature of the item. The solver can be a convex optimization solver. The convex optimization solver can solve for the set of responses that would take the item from a current state towards the target state. The solver can be subject to numerous constraints such as minimizing overall heat time, minimizing temperature variation across the item or across groups of segments of the item, or minimizing a maximum temperature of any segment on the item. The solver can solve for the vector and that generates a minimum error value subject to the constraints of the optimization analysis.

A specific class of implementations of step 305 can be described with reference to FIGS. 4 and 5. In these approaches, an optimization analysis is utilized to produce a duration vector, and may also produce an error value. The duration vector can include a set of elements that represent a duration for a respective set of applications of heat and configurations of the electronic oven that will bring the item from a current state to a target state. The error value quantifies a difference between the target state and an extrapolated end state. The extrapolated end state could be calculated using the duration vector and a set of response vectors as described below. The optimization analysis could utilize, a solver, such as a convex optimization solver, to select the duration vector so as to minimize the error value. The duration vector may include information regarding the sequence of how various applications of energy and configurations of the electronic oven should be applied. However, the sequence could also be selected in a separate step using the duration vector.

Figure 4:
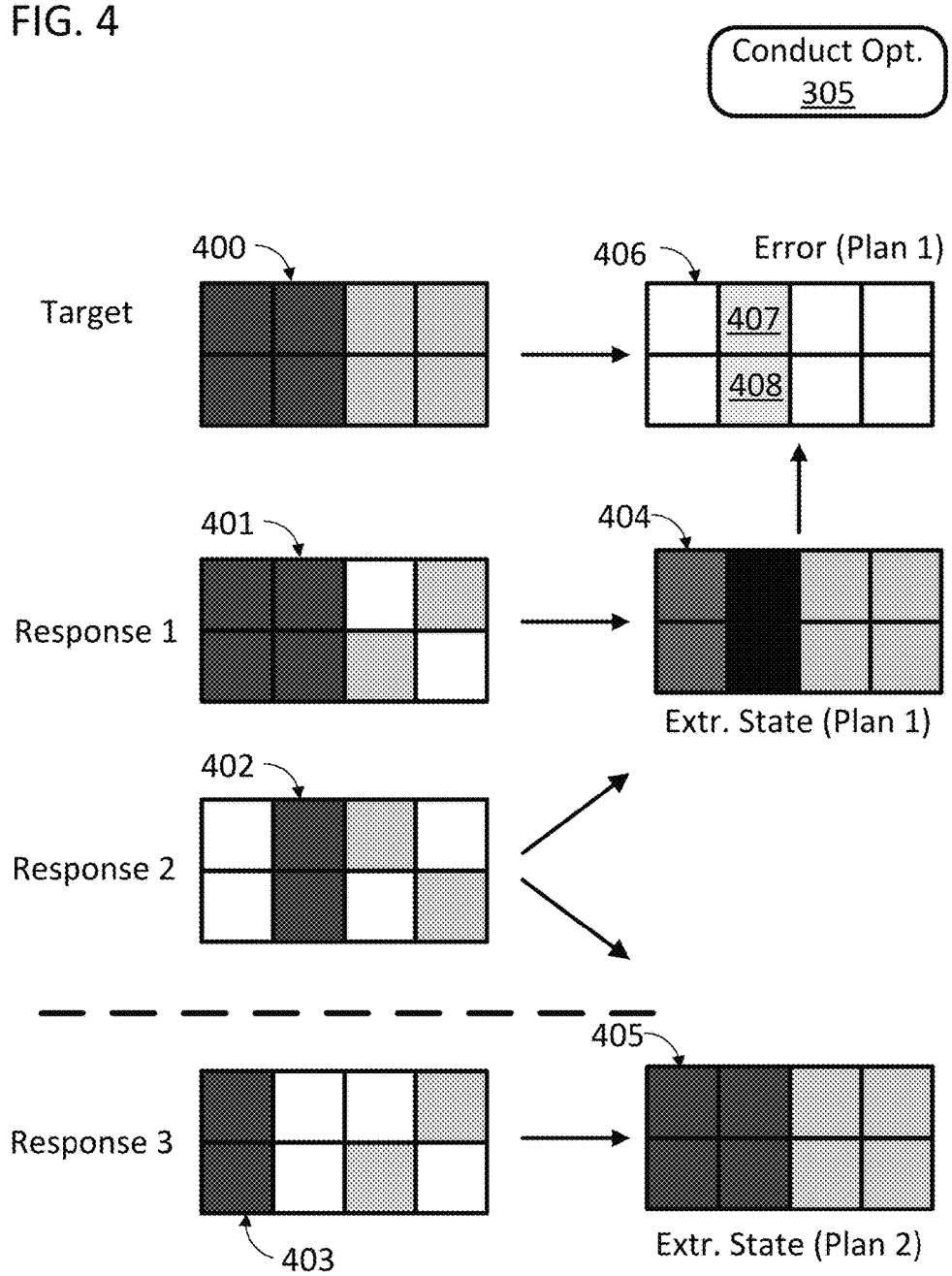
FIG. 4 includes a set of color coded grids that reflect state vectors and response vectors which facilitate a description of some of the optimization analyses in FIG. 3.

FIG. 4 includes multiple grids with eight cells each. The cells are illustrations of the segments of an item that has been placed in an electronic oven. The regular nature of the segments is provided for explanatory purposes, and in an actual application the segments may be of varying sizes and may have irregular shapes. The segments may also be three dimensional volumes as opposed to two dimensional surfaces. FIG. 5 is a data flow diagram to illustrate various optimization analyses that can be conducted in combination with the states and responses of the item in FIG. 4.

Grid 400 provides an illustration of a target state for the item. As illustrated, the goal of this specific heating task is to heat all eight grids, but to heat the left four grid squares to a higher temperature than the four grid squares on the right. Grids 401, 402, and 403 provide illustrations of the response of the item to respective applications of heat and configurations of the electronic oven: response 1, response 2, and response 3. Grids 404 and 405 are illustrations of extrapolated end states for the item that are expected to be reached after the execution of different plans generated using the aforementioned applications of heat and configurations of the electronic oven. Extrapolated state 404 is an extrapolated state that is expected to result from the execution of plan 1. Plan 1 comprises an application of the conditions that lead to response 1 and a following application of the conditions that lead to response 2. Grid 406 is an illustration of an error between extrapolated state 404 and target state 400. The segments in each state of FIG. 4 are shaded to represent an average surface temperature of the segment, or average change in surface temperature of the segment, in which dark shading represents a high temperature/large temperature variation, and light shading represents a low temperature/slight temperature variation In general, data representing the target states, response vectors, extrapolated states, and error of a given plan can be numerical values organized into a vector with each element of the vector corresponding to a segment of the item. A target state of the item could include a target vector with numerical values to represent a target condition for each of the segments of the item. For example, data representing the target state 400 could include a target state vector with eight numerical values to represent the average surface temperature of each segment. Data representing the response of the item to a respective application of heat and electronic oven configuration could take a similar format. The response of the item to an application of heat could be a response vector with a numerical value to represent a change in the average surface temperature of each segment in response to a given application of heat while the electronic oven was in a given configuration. In general, the values of the response vectors could comprise any temperature derivative indicating the response of the item to a selected application of energy. For example, data representing responses 401, 402, and 403 could include three response vectors each corresponding to a respective configuration of the electronic oven and application of energy, and each with eight numerical values for a temperature derivative for the segment (e.g., 10 degrees C./unit time). The unit time could be set to the period for which a particular variable distribution of energy in the chamber relative to an item was held. Likewise, the extrapolated states and error could include numerical values representing an extrapolated temperature and temperature difference for each segment of the item. However, the error could also be a root mean squared (RMS) value derived from such numerical values.

The response vectors and target state vector could be utilized by a solver as part of the optimization analysis to develop a plan to heat the item from a current state to a target state. The optimization analysis could select the responses, and potentially multiple repetitions of those responses, that lead from a current state to a target state. As illustrated in FIG. 4, and assuming an initial state of all white cells (nominal low temperature), extrapolated state 404 would be the extrapolated state expected from the application of the conditions that lead to response 401 followed by the application of the conditions that lead to response 402. This is represented by the fact that state 404 is a combination of the shading in responses 401 and 402.

The optimization analysis solver could select the responses that minimized an error vector represented by grid 406. Minimizing the error can involve minimizing a difference between the target state and the extrapolated state on a segment-by-segment basis. However, the error term can be more complex in that overshoots on temperature can be penalized relative to undershoots on temperature. In addition, errors on one portion of the item could be penalized more heavily than others. In particular, if the identity of the item has been ascertained, the error term can heavily penalize overheating on foods that are prone to burning, smoking, or dehydrating. In the illustrated case of extrapolated state 404, corresponding to plan 1, the error vector 406 associated with plan 1 includes values for two cells, 407 and 408, that were heated to a higher temperature than desired. This level of error could be considered acceptable, in which case plan 1 would be accepted by the control system and executed, or it could be considered unacceptable and lead to the execution of additional processes to produce a more accurate plan.

Figure 3:
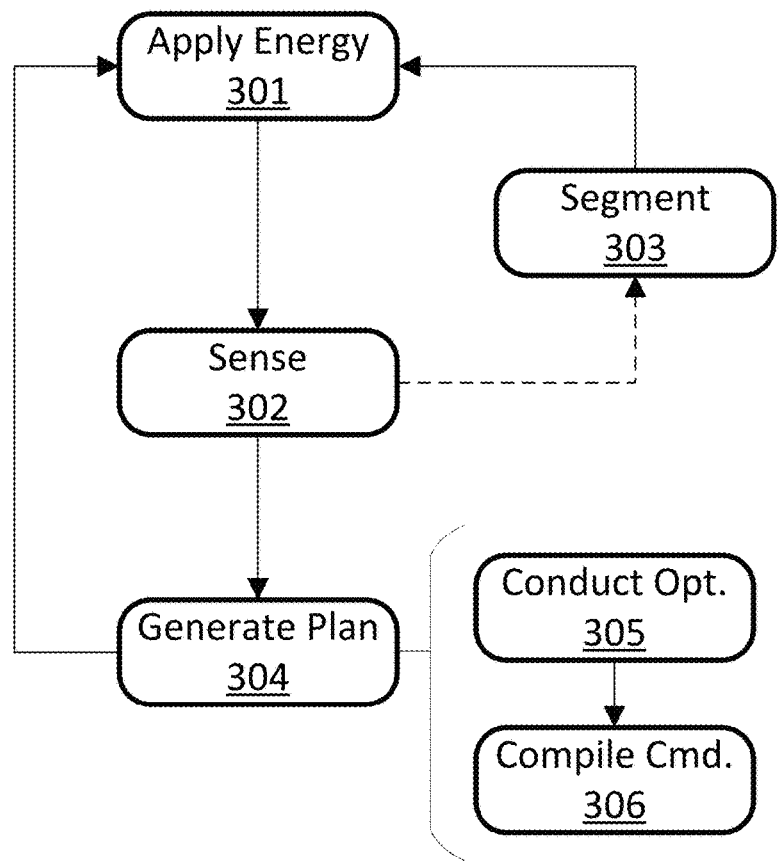
FIG. 3 includes a flow chart for a set of computer-implemented methods for heating an item in a chamber using an optimization analysis in accordance with approaches disclosed herein.

Data flow diagram 500 can be utilized to describe a particular optimization analyses that would lead to the generation of plan 1 from FIG. 4 in accordance with the execution of step 305 from FIG. 3. Data flow diagram 500 includes two response vectors 501 and 502 that correspond to responses 401 and 402 from FIG. 4. The response vectors describe how the item responds to an application of heat. As illustrated, the response vectors include eight temperature derivative values each corresponding to a segment, a respective application of energy, and a respective configuration of the electronic oven (i.e., $dT_{xy}/dt$ where x is the segment number and y is the respective condition). Again, a respective condition is defined as by a respective application of energy delivered while the electronic oven is in a respective configuration. The response vectors can be combined to produce a response matrix A. The response matrix, a target state vector $b_{target}$, and a current state vector $b_{current}$ could be utilized in an equation 504 by a solver 505 to select a duration vector x.

Duration vector x includes a set of numerical values corresponding to a duration for each condition in a plan generated by the convex optimization solver. For example, the duration vector could be a vector such as duration vector 506 and include a number representing a time for which each condition should be held. The numbers could be integers to indicate the given condition should be held for certain multiples of a normalized time period such as 3-5 seconds. The duration vector could be a set of durations for the electronic oven to be in each configuration from the set of configuration for which data is available in the response matrix (i.e., time where y is the respective configuration for which the duration applies). The solver could select the duration vector to minimize the error in equation 504. In the basic example of FIGS. 4 and 5, solver 505 will produce a value of x=[1, 1] to indicate that the plan should comprise a single application of the conditions that lead to response 401 and a single application of the conditions that lead to response 402.

In some applications, the solver, such as solver 505, will be a convex optimization solver. The solver can be subject to constraints beyond minimizing an error between a target state and an extrapolated state. For example, the solver could be constrained by a maximum time allowed for a given heat task to execute, a maximum temperature variation across the item or group of segments, a maximum temperature at a specific point on the item, group of segments, or segment, and other constraints. The solver can be a non-negative least squares (NNLS) solver. An NNLS solver provides certain benefits in that the solutions are only positive values and it would not be possible to apply a condition for a negative amount of time. In other words, and referring to the specific example of data flow diagram 500, the numerical values of duration vector x will all be positive. As a result, generating the sequence of commands to execute a plan from duration vector x will be straightforward and merely require the application of conditions corresponding to each of the response vectors for a period of time set by a corresponding element in the duration vector. However, other solvers can be used. For example, a standard least squares solver could be used, and functionality provided on such an electronic oven could allow certain areas of the item to cool and essentially reverse the effects of a given application of energy. In addition, other solver's such as mixed integer linear programming, solvers for KKT optimality conditions, and solvers for Fritz-John conditions, and combinatorial searchers for optimality criterion such as branch and bound could also be utilized.

Figure 5:
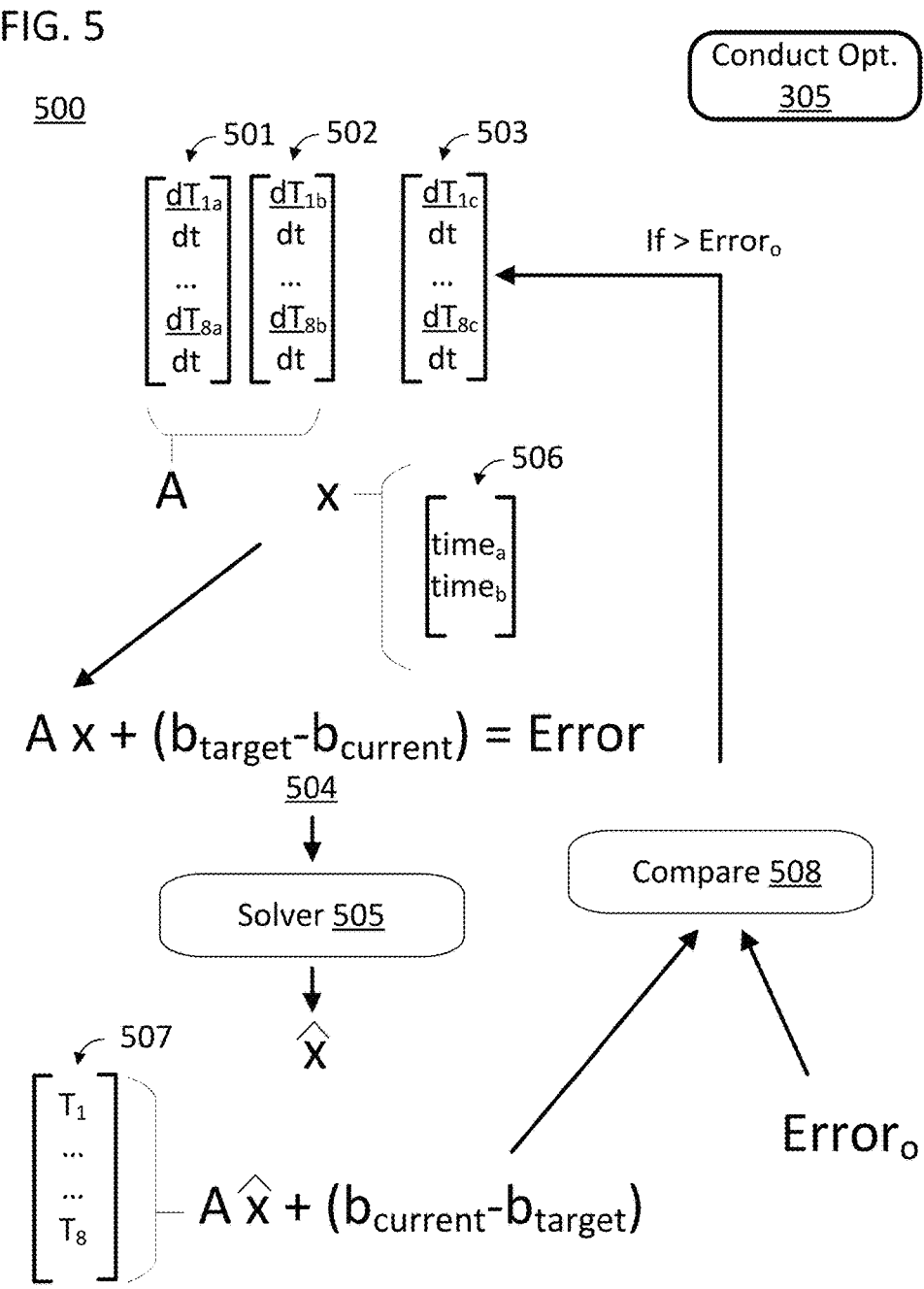
FIG. 5 includes a data flow diagram that facilitates a description of some of the optimization analyses in FIG. 3.

One benefit exhibited by certain embodiments described with reference to FIGS. 4 and 5 is that the optimization analysis not only obtains information regarding the plan, in the form of the duration vector, but also obtains information regarding whether additional discovery steps are required to produce a plan that meets a certain degree of accuracy, in the form of the error value. The control system of the electronic oven can be configured to determine that the error value from the optimization analysis exceeds an acceptable value, and can trigger the acquisition of additional information for the planning process. The additional information could be obtained by looping back to step 301 in FIG. 3 and heating the item with an application of energy while the electronic oven is in an additional configuration, wherein the additional configuration is selected upon determining that the error value exceeds the acceptable error value. The additional configuration could be a physical configuration.

The additional configuration, and indeed the configurations generally, could be selected at random subject only to the constraint that it is different from physical configurations for which a response has already been measured. However, the configurations could also be selected using some form of intelligence such as by setting the configuration to the furthest possible position on the configuration-space from the configurations that were already analyzed, or by evaluating the response of the item to determine which configuration would likely yield the most novel information.

To continue the description of how the optimization analyses can also determine if more information is needed, the response of the item to an application of energy while the electronic oven is in the additional configuration is sensed using a sensor to obtain sensor data that defines a respective response. The new response information could then be used to produce an update plan based on the additional information. If the new analysis produces an extrapolated state that is within an acceptable range of the target state, the plan can be executed using the duration vector, and the control system will know that enough discovery has been conducted. It is possible that the additional information will not improve the error performance such that even further discovery will need to be conducted. Also, the discovery steps can be conducted intermittently with the execution of steps derived from a prior plan or can be conducted entirely separately until enough data has been collected for an accurate plan to be executed.

The manner in which additional discovery can be conducted can be described with reference again to FIGS. 4 and 5. Referring back to FIG. 4, the error associated with grid 406 might be greater than an acceptable value. A control system could then determine this fact and work to obtain third response 403 by heating the item again under an additional configuration and sensing sensor data that defines third response 403. The control system could then conduct a second optimization analysis to produce a second plan leading to extrapolated state 405. The second optimization analysis could be the same as the first optimization analysis except the analysis would also use data associated with response 403 in addition to the data associated with responses 401 and 402. As illustrated, the additional information leads to a superior plan. Plan 2, as represented by extrapolated state 405, would be an execution of the conditions that generated second response 402, and the conditions that generated third response 403. As illustrated, extrapolated state 405 matches target state 400 such that the optimization analysis would generate an error value of zero. At that point, the control system would know that sufficient information had been obtained and would proceed with the actual execution of the second plan. The benefit of these approaches is that the plan is obtained at the same time the performance of the plan is quantified, which allows the control system to either execute the plan immediately, or quickly determine that more information is needed.

A specific implementation of the approach described in the previous paragraph can be described with reference again to FIG. 5. An error vector 507, which includes a temperature value for each segment of the item ($T_1 \ldots T_8$), can be calculated by multiplying the response matrix A by the duration vector x, obtained from solver 505, adding the value to the current state vector and subtracting the target state vector. Error vector 507 therefore represents the difference between the target state and the extrapolated state. The resulting value can be compared to an acceptable error value Error, that is set by the control system. The acceptable error value can be controlled based on the expected performance of the electronic oven. In a first iteration of the optimization analysis, the response matrix A only contains response vectors 501 and 502, corresponding to responses 401 and 402 from FIG. 4. As a result, comparator 508 will determine that the optimization output produced an error that is too high when compared with the acceptable error value.

Data flow diagram 500 illustrates how an additional response vector 503 can be obtained for addition to response matrix A in a second iteration of the optimization analysis. Although it is possible for an additional response vector to have no impact on the error vector, the additional flexibility afforded to the solver will generally decrease the error value represented by the error vector. If this updated error value is low enough, the plan can execute without obtaining additional response data. However, if the updated error is still too high, an additional iteration of the illustrated loop can be performed to obtain more response data and run additional optimization analyses. Ideally, response vector 503 will correspond to a response such as response 403. Response 403 is ideal because a plan that applies the conditions associated with responses 402 and 403 will result in an extrapolated state that exactly matches the target vector.

The error value and duration vector can also be used to determine if a desired target state presents an intractable problem for the electronic oven with a specified level of acceptable error. Intelligence regarding this determination can be built into the control loop that triggers another round of discovery (e.g., the loop back from comparator 508 in FIG. 5). The difference between an intractable problem, and one for which more data is needed, can be at least partly determined by comparing a temperature of each segment in the extrapolated state of a plan with the temperature of the segments in the target state. If certain segments have temperatures in excess of the target state, but the error value has not yet receded below the acceptable error value, then the control system has an indication that the problem may be intractable. A limit on discovery of three to five additional rounds may be tolerated once this threshold has been crossed. At that point, the optimization analysis may indicate that an error has occurred and cease discovery. Alternatively, the control system can be configured to relax the tolerance of the solver to allow for a larger temperature variation from the target state.

The duration vector generated by the optimization analyses described above can include information regarding an absolute duration for which each configuration should be applied, but might not specify the order in which the configuration should be applied. As such, generation of the plan may include additional processing to conduct step 306 in which commands are compiled into a specific sequence to execute an actual plan by the electronic oven. The sequence of commands can transition the electronic oven between the set of configurations, apply the applications of energy, and assure that the electronic oven is in each of the physical configurations for a duration that is proportional to a respective element in the duration vector. However, the sequence of commands can be compiled in various ways to achieve different results. An example of different sequencing, and the resulting effect on an item in the chamber through the course of a heating task, can be described with reference to FIG. 6.

FIG. 6 includes two sets of axes 600 and 601. The two sets of axes have x-axes in units of time in seconds and y-axes in units of temperature in degrees Celsius. Each axes also includes two curves that approach two target temperatures. The two target temperatures, 602 and 603, are the target temperatures for different segments in a target state for the item. On both sets of axes, the two segments approach their target temperatures and then level off.

The curves on axes 600 and 601 illustrate the execution of two separate plans that were generated from the same duration vector, but were compiled into different sequences. On axes 600, the first segment and second segment are heated all the way to their target temperatures in series. On axes 601, the plan was sequenced during the compiling step to minimize a maximum temperature variation across the surface of the item. Different constrains can be applied to the compiling of a sequence, and the constraints can vary based on an identity of the item or sub-items in the chamber. However, minimizing a maximum temperature variation is a beneficial approach in most instances because some of the optimization analyses disclosed above do not take into account a decay on the temperature of segments and may inaccurately capture the effect of heating one segment on another segment. These two deficiencies can lead to regions of the item being either colder or hotter than expected. Though one of these deficiencies can be minimized by having the extrapolated states keep track of temperature decreases via the inclusion of a basic decay function on a segment-by-segment basis, the deficiencies can both be minimized by assuring that the item is heated via a sequence of commands that promote an even distribution of heat through the item throughout the heating process.

As mentioned previously, the optimization analyses can be repeated periodically while the item is being heated towards a target state. The period for repetition can be set to a fixed time or can be reliant on a detected event. For example, if a deviation detector determines that the state of the item has strayed too far from an extrapolated state, the optimization analysis can be conducted again. As another example, the period of repetition can be set based on an observed fall-off in the accuracy of the extrapolated states, and can be adjusted during the lifetime of an electronic oven through a machine learning system that tracks the fall off-in accuracy of the extrapolated states.

The frequency at which the additional iterations of the analysis are conducted should be controlled to assure that the accuracy of the plan that is currently being executed is maintained, while at the same time allowing the effect of a given plan to be sensed and registered by the control system. Given that the execution of each action is on the order of seconds, and the accuracy of the heuristic's prediction tends to fall off on the order of tens of seconds, the period between additional iterations of the analyses should be greater than 3 seconds and less than 15 seconds. The period can be extended or shortened to a large degree based on an identity of the item. For example, items that tend to exhibit unpredictable and widely time variant responses can be subjected to near continuous re-planning. On the other end of the spectrum, homogenous items like cups of tea can be heated with a lower frequency of repetition for the optimization analysis.

The response data can be updated throughout the heating process. As such, additional executions of the optimization analysis conducted during a heating task can utilize response data obtained during the execution of a previously generated plan. In other words, sensor data that defines a response by the item to a given condition can be collected while the oven is placed in that condition as part of the execution of a previously generated plan. Alternatively, the additional iterations of the optimization analysis can be associated with interruptions of the heating task in order to run additional discovery. Regardless of how the additional response data is obtained, the data can then be used to check if the response vector that was previously collected is no longer accurate. If the newly obtained additional sensor data indicates that the response vector does not match with the previously stored response vector for the same condition, the response vector can be updated in the library and used during later iterations of the optimization analysis.

In general, the optimization analysis will be able to perform with a tighter tolerance if the electronic oven is able to exhibit a larger number of configurations with variant characteristics, and a response for a large number of those configurations are analyzed. In other words, both the number of discovery iterations and the actual number of configurations that an electronic oven can exhibit are inversely proportional to an appropriate tolerance for the optimization analysis. For example, in approaches that utilize a set of reflective elements, benefits accrue when the set of reflective elements includes at least three reflective elements and the control system can generate commands that independently alter all three reflective elements in the set. In addition, if the number of segments an item is divided into increases, with all else held equal, the number of configurations generally needs to increase to hit a required tolerance level. As a baseline, if the set of segments includes at least 10 elements, then the set of physical configurations should generally include at least 10 distinct physical configurations.

With specific reference to an electronic oven in which the configurations are physical configurations set by reflective elements like the one illustrated in FIG. 2, with the reflective elements placed on a ceiling of the chamber, roughly homogenous items placed in the chamber can be uniformly heated to within a target acceptable error level of 5 degrees Celsius with a set of at least 5 distinct configurations and 5 segments. If the regions of interest increase to 12 regions, a set of at least 10 configurations will achieve acceptable results under similar constraints. Non-uniform heating, and non-homogenous items have an appreciable impact on the number of configurations required. For example, in the example described with reference to FIG. 7 below, which involved a heating task calling for a highly non-uniform distribution of heat, at least 25 configurations provide a likelihood of hitting targets within 2 degrees Celsius RMS error across 12 segments.

Figure 7:
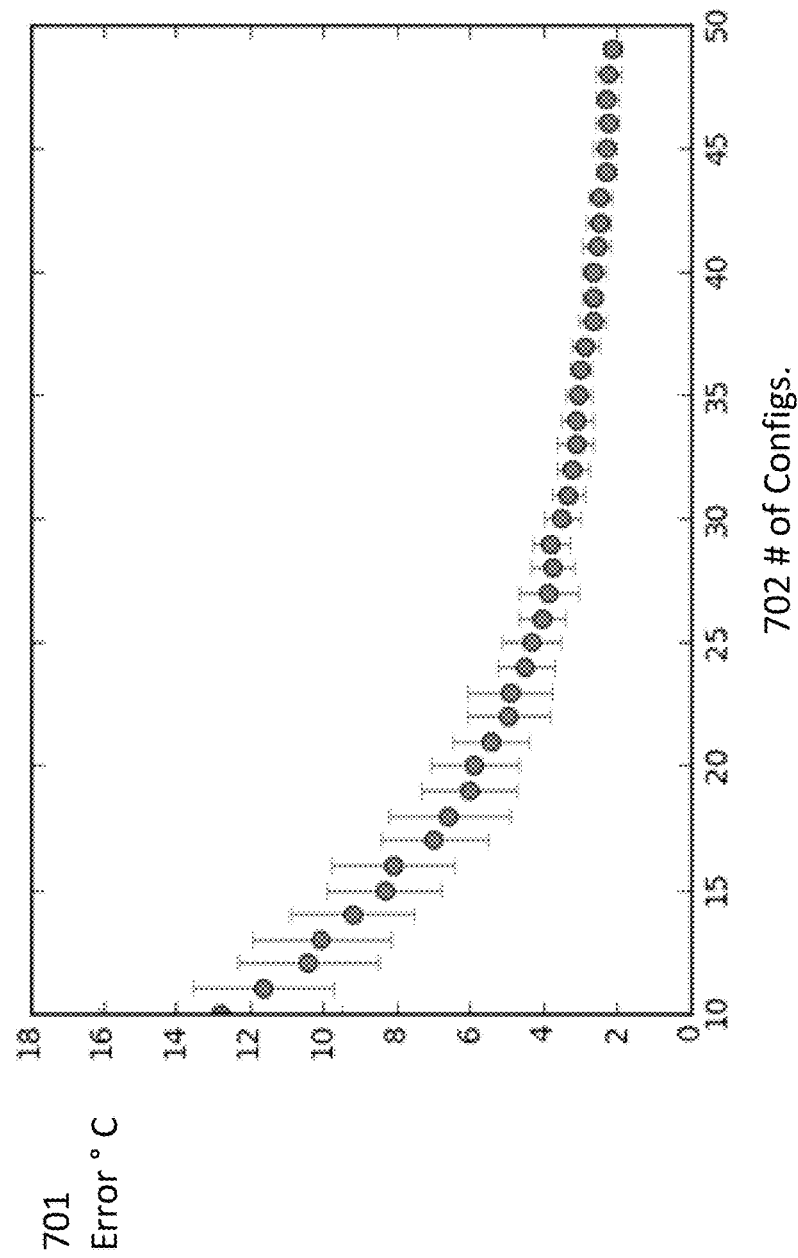
FIG. 7 includes a set of axes that chart a simulated error of an optimization analysis where the x-axis is a number of configurations available to an optimization analysis and the y-axis is the error in degrees Celsius.

FIG. 7 includes a set of axes 700 where the x-axis is the number of configurations available to the control system, and the y-axis in units of RMS error across all segments in units of degrees Celsius. The charted curve was obtained from simulations in which there were 12 regions of interest with one having a requirement of being 20 degrees higher than all other regions. The item in this case was an array of pools of liquid stored in a microwave-transparent container. Each pool of liquid was treated as a segment for the optimization analysis. In this sample, the desired number of configurations was on the order of 25 configurations. However, this is a demanding requirement as it is somewhat uncommon to require a portion of an item in the chamber to be 20 degrees hotter than the rest. The number of configurations could, in basic cases, be one. In the case of a fortuitous initial discovery state and a homogenous item, the optimization analysis may determine that a target state can be obtained after a single round of discovery and keep the electronic oven in a single configuration for the duration of the heating task. However, if the item is not uniform, the initial conditions vary greatly, or the configurations are highly uneven in terms of how heat is distributed, the number of required configurations can substantially increase.

The plans developed using the techniques in this section can be used in combination with more complex approaches described in other sections. The optimization analyses described in this section can be used as the heuristic or extrapolation engine for the deterministic planner control system described below. For example, the approach in FIG. 3 could be extended to include generating a second plan to heat the item, where the second plan was developed by a more computationally intensive and accurate planning process. The second plan could be generated using a deterministic planner as described below, and the deterministic planner could use the plan generated in step 304 as the heuristic for estimating a future plan cost when generating the second plan. The optimization analyses described in this section could also be the policy for the reinforcement learning approach described below. For example, the control system could automatically heat the item in the chamber towards a target state using a reinforcement learning system where the plan generated in step 304 was used as a policy for the reinforcement learning system. The policy could be used to make a rough-cut determination of which action to take from a given node in the reinforcement learning system while the system was attempting to take a greedy step instead of exploring the feature space.

Evaluative Feedback—Reinforcement Learning Control

Figure 8:
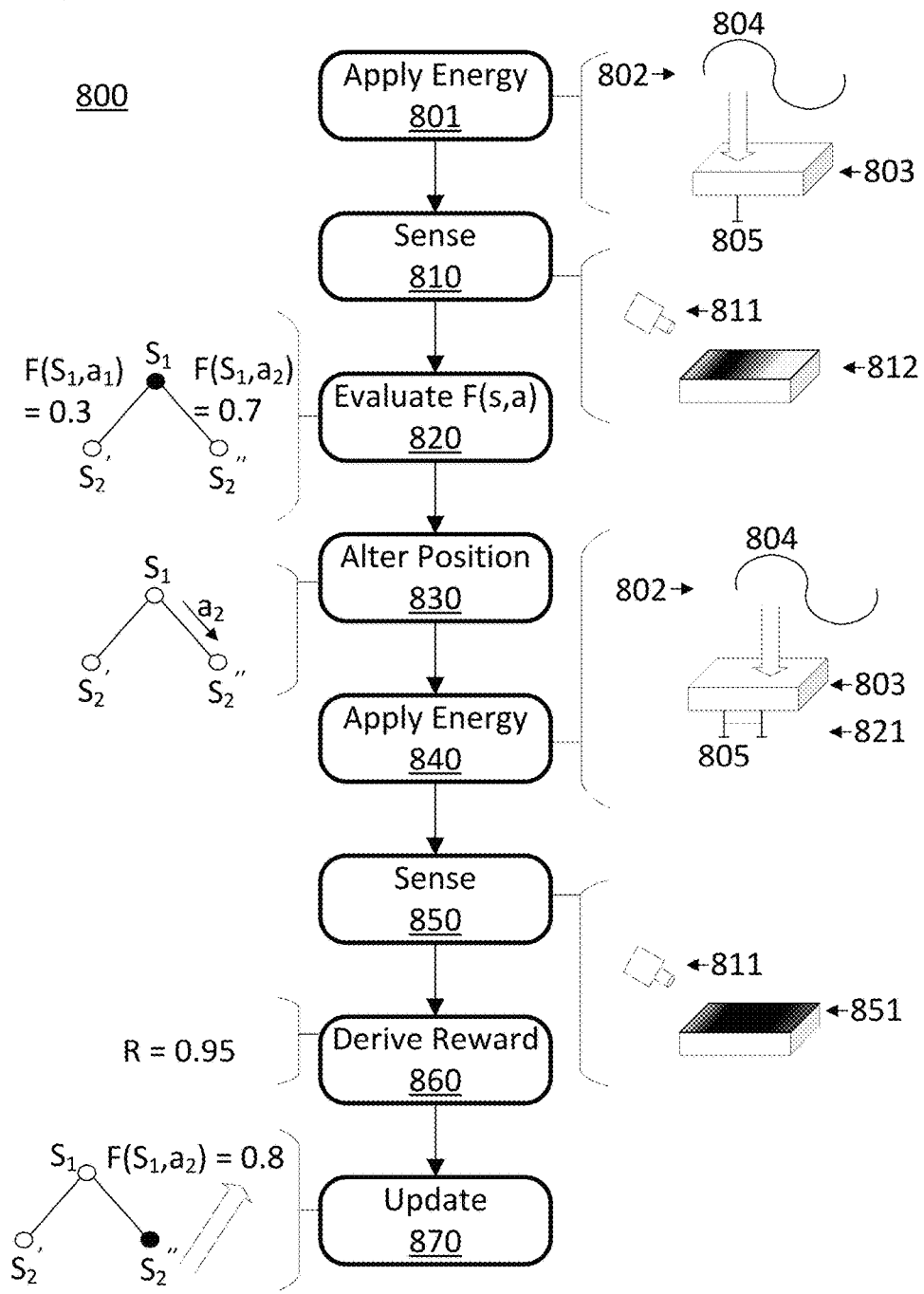
FIG. 8 includes a flow chart for a set of computer-implemented methods for heating an item in a chamber using an evaluative feedback control system with reinforcement learning in accordance with approaches disclosed herein.

A set of example computer-implemented methods utilizing both evaluative feedback and a reinforcement learning training system to heat an item in a chamber can be described with reference to flow chart 800 in FIG. 8. In step 801, energy is applied to the item with a variable distribution. The variable distribution can be caused by the standing wave pattern of a microwave energy source applied to the chamber. The variable distribution can also be caused by the targeted application of energy to the item. An example variable distribution 802 is illustrated as being applied to item 803. Variable distribution 802 includes a local maxima 804 with a relative position 805 with respect to item 803. In this example, the relative position has a value of zero in step 801.

In step 810, a surface temperature distribution for the item is sensed using an infrared sensor. The infrared sensor could be an infrared camera 811 capturing infrared radiation from item 803. The surface temperature distribution 812 can be sensed while the relative position value remains at zero. The surface temperature distribution can at least partially define a state $S_1$. Step 810 could also involve sensing RF parameters associated with the delivery of energy to the item. In this case, some aspects of step 810 could be conducted simultaneously with step 801. State $S_1$ may be more fully defined by a collection of information regarding the item and the instantaneous condition of certain controlled aspects of the system. State $S_1$ can be a unit of data that is an input to the action-value function of the reinforcement learning training system. Data from the surface temperature distribution partially defines the state in that the data can be used either alone or in combination with other information to distinguish state $S_1$ from at least one other state.

In step 820, the control system will evaluate the action-value function $F(s,a)$ using the first state as an input to determine a second state $S_2''$ in a set of potential second states $(S_2', S_2'')$ that provides a maximum potential reward value. This step 820 could involve providing the first state and a set of potential actions that can be taken from the first state to the action-value function as inputs and selecting the action which maximizes the magnitude of the action-value function. For example, the inputs to the action-value function could be the current state $S_1$ and an action that changed the relative position of the item being heated by 10 cm with respect to the variable distribution of energy applied to the item. This movement is illustrated in FIG. 8 by action $a_2$ and the actual alteration of the relative position 805 from a value of zero to 10 cm as indicated by reference number 821.

In steps 830 and 840, the control system will act upon the determination made using the action-value function in step 820 that found $S_2''$ to be the optimal state to move to. This can be achieved by action $a_2$ which can involve moving either the item, the location of the local maxima of the variable distribution relative to the chamber while keeping the item stationary, or a combination of both moving the item and the local maxima. In keeping with the example above, in step 830, the relative position 805 will be altered from zero to 10 cm by the control system. In step 840, energy will be applied to the item via the variable distribution. Steps 840 and 801 can be component parts of a continuous application of energy to the item, but can still be conceptualized as separate steps for purposes of understanding the operation of these methods. The relative movement of item 803 and variable distribution 802 is illustrated as being along the surface of item 803, but it could involve a movement within the volume of item 803.

In step 850, a second surface temperature distribution for the item is sensed using an infrared sensor such as infrared sensor 811 from step 810. The infrared sensor could be obtaining surface temperature distributions for the item at a faster rate than is needed by the control system and storing the distributions in a buffer or disk until specific samples are required by the control system. In the alternative, the infrared sensor could obtain periodic distributions as needed by the control system. Step 850 could also involve sensing other parameters associated with the state of item 803 such as RF parameters like return loss and impedance matching.

As illustrated with respect to step 850, the movement of the local maxima will result in a more even distribution of heat 851 across the item. However, this will not always be the case. The movement might not result in a more even distribution of heat or might not decrease the variance in the distribution of heat as much as expected from the evaluation of the action-value function in step 820. Regardless, in step 860, a reward value will be derived using the second surface temperature distribution. As mentioned previously, the reward value can be proportional to a variance in the surface temperature distribution of the item. The derivation in the reward value in step 860 can involve the use of numerous other factors in combination with the surface temperature distribution. The derivation can alternatively involve an evaluation of RF parameters associated with the heating of item 803 such as return loss and impedance matching.

In step 870, the action-value function will be updated based on the reward value that was derived in step 860. Before any training has taken place, the action-value function can be initialized either randomly or with an engineered guess as to the appropriate values of the function. As such, the evaluation conducted in step 820 to determine the maximum potential reward value for a specific action from $S_1$ is conducted with imperfect information. However, the measurement conducted in step 850 and the derivation of reward values in step 860 can be used to update the action-value function so that if the same state $S_1$ is encountered in the future, the control system will have better information regarding what action should be taken.

The control system can be configured to randomly replace the evaluation taken in step 820 with an exploratory selection that selects a different action from what the action-value function would indicate as the optimal action. In this way, the control system is able to explore the space of potential states and determine if a different set of actions would lead to a better result. Steps 860 and 870 can be skipped in situations where the exploratory step was taken. The control system can stochastically vary between exploratory selections and selections guided by maximization of the action-value function (i.e., greedy selections). The probability of making an exploratory selection can be altered throughout the course of a training episode and throughout the useful life of a device's operation.

Utilizing the information gleaned from evaluative feedback to train the control system using a reinforcement learning training system provides certain benefits when applied to a control system used to heat arbitrary items placed in a chamber. In particular, there is no need to provide predetermined training data as in supervised learning approaches. As long as the rewards system is configured to guide the training system appropriately, the merit of certain courses of action can be evaluated regardless of whether or not they have even been considered ex ante by a human designer. As heating items in a chamber, in particular heating food items in a microwave, can be guided by a set of principles that can be generalized across a large number of food items, such a system of rewards can be readily developed for wide applicability to potential training scenarios into which the control system could be placed without in-depth consideration of all the myriad characteristics of the items that may be placed in the chamber by a future user. Another benefit is attributable to the fact that reinforcement learning is beneficially applied to situations in which the reward signal is noisy and delayed. In the case of an electronic oven, the benefit of a particular action taken by the electronic oven might be delayed numerous time steps from when the action was taken. This is again an artifact of the time it takes for heat to diffuse through an item being heated. However, as reinforcement learning is a time based system, rewards offered numerous time steps in the future can be fed back to affect decisions several time steps in the past to address this issue.

Some of the approaches disclosed herein include a training system that approximates the action-value function using a neural network. The action-value function will beneficially include a set of values for every potential state in which the system could reasonably find itself in. If the states of the control systems described with reference to FIG. 8 were guided by states that were simple matrices with temperature values corresponding to the coordinates on a two dimensional plane, the number of potential states would be considerable as they would involve each potential temperature at each of the locations in the two dimensional plane. Given that the states can include far more information regarding the condition of the system, it is easy to see how the number of states could become unwieldy. A function approximator can be used to reduce the number of states required for the function. In short, numerous states derived from the sensors and control system would be mapped to a single state with similar characteristics. The function approximator could be a neural network, or any back propagation regression model.

Figure 9:
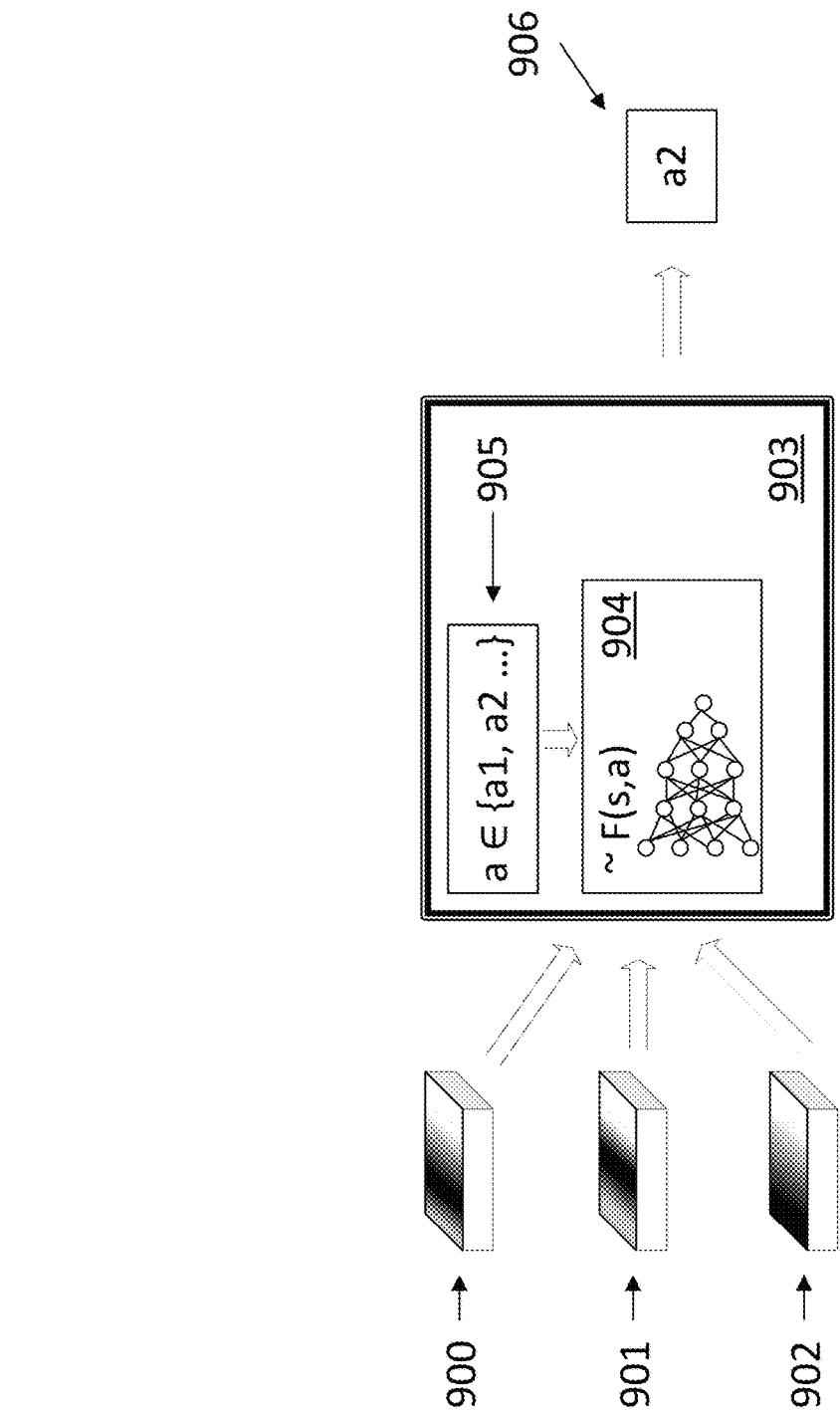
FIG. 9 includes a block diagram illustrating the operation of a control system with a function approximator serving as an action-value function in accordance with approaches disclosed herein.

The use of a function approximator for the states utilized by the controls system can be described with reference to a control system with states set by the surface temperature distribution of the item. FIG. 9 illustrates three surface temperature distributions 900, 901, and 902 along with a control system 903. Control system 903 includes neural network 904 and access to a set of stored actions 905. The set of stored actions include all of the potential actions that the control system could take from any given state. Neural network 904 serves as a function approximator for the action-value function F(s,a). Surface temperature distribution 900 could correspond to a detected current state of the item being heated by the system. Surface temperature distributions 901 and 902 could correspond to stored states that are valid inputs to the function used by the action-value function. Neural network 904, or any back propagation regression model based system, could take in data representative of the detected state via surface temperature distribution 900 and a potential action from the set of stored actions 905, and provide a similar potential reward value to what would be provided by controls system 903 if distributions 901 and 902 were applied to controls system 903 without having to store a specific set of values for state 900. Thereby, the function approximator greatly reduces the number of specific states that the reinforcement learning training system needs to be trained for. Control system 903 can utilize neural network 904 to execute a step similar to step 820 and output a selected action 906 in a less resource intensive manner than one in which values must be stored for each state independently.

The logic used to assist as the function approximator for the overall training system may require training of its own. For example, if the training system is a neural network, the specific weights of the network will need to be trained so that the neural network becomes a fair approximation for the action-value function. The training system for the neural networks can be a back propagation regression training model. The data used to train the network can be the same data used to update the action-value function itself as described above in step 870.

Some of the approaches disclosed herein include a neural network training system that utilizes random samples of past experiences as the training data. Keeping with the specific example of a reinforcement learning training system using an action-value function that is approximated via a neural network, the training system can store a set of experience data points as actual observations are taking place. For example, the experience data point could include data to represent the reward value derived in step 860, the first state used in step 820, the second state determined in step 850, and the action used to transfer from the first state to the second state in step 830. These experience data points could then be sampled at random to provide a set of training data for the neural network. The training data could be used to train the neural network according to approaches where loss functions are iteratively minimized according to a stochastic gradient dissent evaluation. This approach is beneficial in that the training of the neural network can harvest multiple sets of training data from the same set of physical measurements to increase the speed at which the function approximator is provided.

Evaluative Feedback—Deterministic Planner Control

The control system of an electronic oven can also include a deterministic planner to generate a plan to heat an item placed in the chamber of the electronic oven. The plan can be generated based on the characteristics of the item and instructions provided by the user as to how the item should be heated. The deterministic planner could select a sequence of actions to heat a specific item in accordance with instructions provided by the user. The actions in the sequence could each be selected from a set of actions the electronic oven and control system were capable of executing. The set of actions will depend on the characteristics of the electronic oven. For example, an electronic oven with a rotating tray may include "rotate tray clockwise 5 degrees" and "rotate tray counter clockwise 5 degrees" in its set of actions while an electronic oven with a tray that could translate laterally in two dimensions could include "move tray left 5 cm," "move tray right 5 cm," "move tray back 5 cm," and "move tray forward 5 cm" as potential actions. Generally, the actions may include altering a relative position of a distribution of energy in the chamber with respect to an item in the chamber and altering an intensity of the energy applied to the chamber. After generating the plan, the control system can execute the plan by performing each of the actions in the sequence of actions to thereby heat the item in the chamber.

Figure 10:
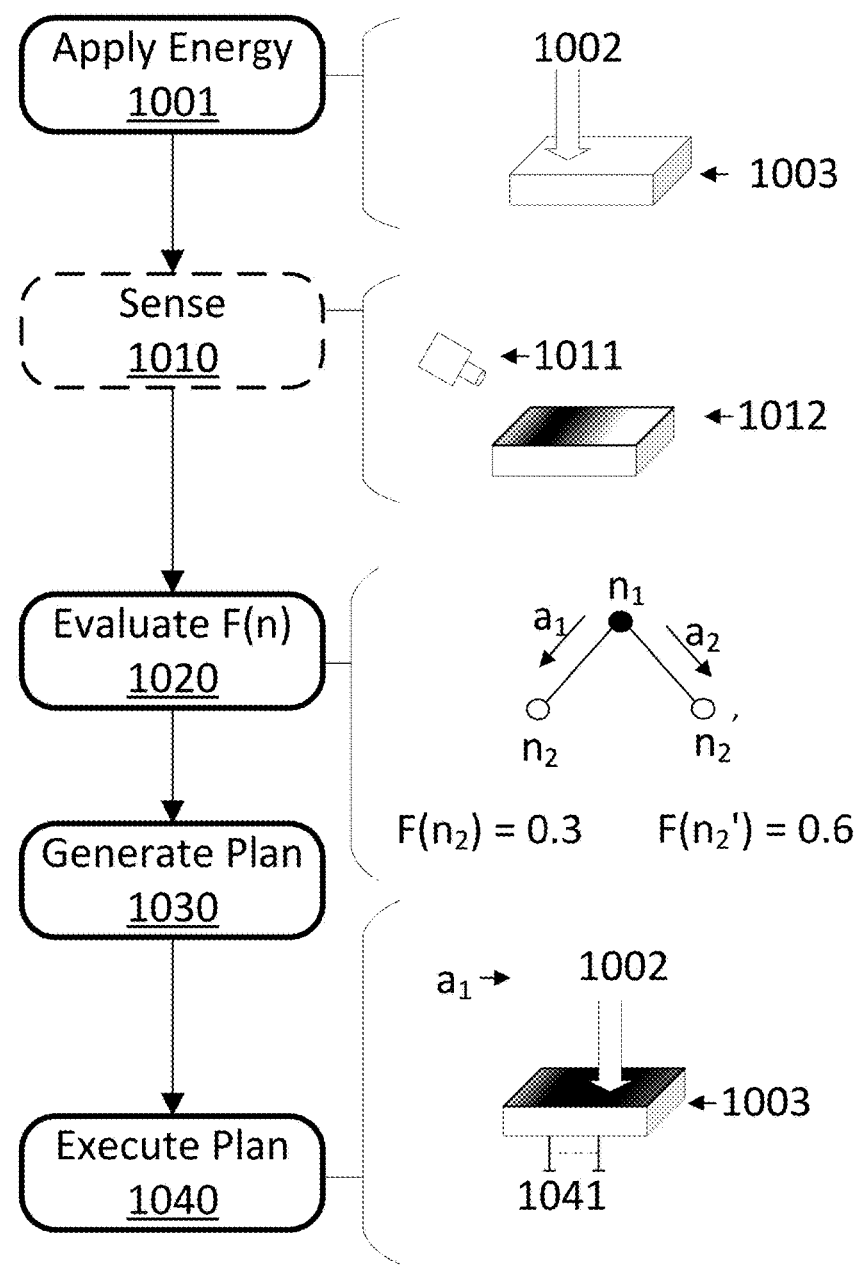
FIG. 10 includes a flow chart for a set of computer-implemented methods for heating an item in a chamber using a deterministic planner in accordance with approaches disclosed herein.

A flow chart 1000 of a set of methods for heating an item in a chamber with an electronic oven that utilizes a deterministic planner is illustrated in FIG. 10. Flow chart 1000 begins with step 1001 of applying energy to the item from an energy source. Step 1001 can generally be executed in accordance with the same principals as step 801 from FIG. 8. The application of energy 1002 does not heat item 10003 evenly and creates an uneven surface temperature distribution on the item. This surface temperature can be sensed in optional step 1010 which can generally be executed in accordance with the same principals as step 810 from FIG. 8. The surface temperature distribution 1012 can be sensed by infrared sensor 10011. Information gleaned from this surface temperature distribution can then be used by the control system in various ways as described below.

Flow chart 1000 continues with step 1020 in which a function is evaluated to generate a first function output. A first potential action is used to evaluate the function. The function could be a cost function $F(n)$ and the function output could be a plan cost calculated with respect to node n. Node "n" can be a node that is accessed when traversing a graph of all the potential plans that can be executed. The graph can be a hyper dimensional graph where movement from one node to another is set by all of the potential actions that can be selected when generating a plan to traverse the graph. For example, in an electronic oven with 4 potential actions (raise heat 1 degree, lower heat 1 degree, rotate tray left, and rotate tray right) each node would be associated with four direct neighbors in a forward direction and a single direct neighbor in a backwards direction. Each node could be fully defined by an initialized state and a sequence of actions executed from the initialized state. The plan cost can be a cost of executing a plan up to node "n." However, the plan cost can also be an estimated total plan cost (i.e., an expected total cost of executing a plan that includes node "n" from start to finish). For a planning process only concerned with the time it takes to complete a task, the cost of the plan can be as basic as the number of steps necessary to reach the end state, or the cost could be more complex as described below.

Step 1020 is illustrated by the evaluation of the function two times—once for node $n_2'$ and one for node $n_2$. As illustrated, the function is first being evaluated with a first potential action $a_1$ to generate a cost for node $n_2$ and then is being evaluated with a second potential action $a_2$ to generate a cost for node $n_2'$. Actions $a_1$ and $a_2$ can each be members of mutually exclusive plans. In the illustrated case, node $n_2$ is associated with a lower plan cost. As such, at least according to this evaluation, the best option for minimizing the cost of execution of the overall plan would be to execute action $a_1$ next instead of $a_2$.

The action can be used to evaluate the function in various ways. For example, the state of the item could be extrapolated using an extrapolation engine with knowledge of action $a_1$, knowledge of how the item responds to certain actions, and information regarding the state of the item associated with state $n_1$. Different approaches for the extrapolation engine are discussed below. However, a basic example of an extrapolation engine for purposes of initial explanation is a physics simulator. The physics simulator could simulate the response of the item to specific actions that could be taken by the electronic oven. The physics simulator could be a thermodynamics modeling tool that took the dimensions of the electronic oven, the characteristics of the energy source, and the dimensions and characteristics of the item to simulate a response to a given action and thereby extrapolate the state of the item in response to the action.

Evaluating the cost function for various nodes allows the deterministic planner to generate a plan to heat the item in a desired manner. As such, flow chart 1000 continues with step 1030 in which a plan is generated to heat the item. The plan could be generated using the output of the function that was evaluated in step 1020. In keeping with the basic example provided above, the output of $F(n_2)$ was used to generate the plan because action $a_1$ was selected for the sequence of actions that comprise the plan instead of action $a_2$. In this example, two outputs from the cost function were used to select the plan. For more complex situations a large number of function evaluations could be used to generate a plan. The cost function can also be evaluated in an iterative or recursive manner such that the plan cost calculated for any given node could be used to either select actions for the plan or to select nodes that should be investigated further through additional function evaluations.

In step 1040, the plan is executed by stepping through the actions in the sequence of actions that comprise the plan. In the illustrated case, action $a_1$ has been selected and results in an adjustment of the relative position of the distribution of energy in the chamber 1002 by a distance 1041 so that the surface temperature distribution on item 1003 is more uniform. The plan can include any number of actions and can terminate when item 1003 appears to be heated a desired amount. Alternatively, the plan can terminate at certain periodic intervals to allow for course corrections in the overall heating process. In particular, the actual temperature of an item as it is being heated will tend to deviate from the extrapolated state over time due to imperfections in the performance of the extrapolation engine. Therefore, the deterministic planner can be designed to produce plans of a limited duration that are followed on by additional plans that are developed as the prior plan is being executed. The actions that can be selected from and utilized during execution of the plan are described in more detail in a separate section below.

The cost function can include a traversed plan cost and a future plan cost. In other words, the cost function can include a component that represents the cost incurred in reaching a specific node, and a cost that will be incurred by continuing from that node to a desired end state. The traversed plan cost can be calculated using an extrapolation engine as described elsewhere in this specification. The future plan cost can be calculated using a heuristic as described elsewhere in this specification. The extrapolation engine can provide a relatively accurate cost value for reaching a given node based on recursive function evaluations and a relatively accurate estimate of the state of an item corresponding to the node under evaluation.

The value of the traversed plan cost is referred to as "relatively" accurate as compared to the accuracy of a future plan cost derived by a heuristic. The heuristic can provide an estimate of the cost of continuing from a given node to a desired end state. The heuristic will generally not be as computationally intensive as the extrapolation engine and it will not need to know every single action that will allow the control system to travel from a given node to an end state. This is in contrast to the extrapolation engine which should know each of the nodes that need to be traversed to reach the current node in order to provide the traversed plan cost. To use the analogy of a driverless car navigating an unfamiliar city to reach a certain point, the extrapolation engine will determine an exact description of how far the driver has moved (traversed plan cost) after a number of turns through the city streets (actions), while the heuristic will just take a crow-files distance measurement from the desired end location to the current location (future plan cost as estimated by heuristic). In the current application, the extrapolation engine could be a physics simulator as described above while the heuristic made a rough approximation of the future cost. The heuristic could take a delta of a sample of points on a surface temperature distribution of the item to be heated against a desired ending surface temperature distribution of the item. The heuristic could then sum all of the deltas and multiply it by a scaling factor as a rough estimate of how much more the plan will cost to complete. In different approaches, either the heuristic or extrapolation engine could operate in accordance with the optimization analysis described above with reference to FIGS. 3-5.

In accordance with the previous discussion, evaluating the function to obtain a total plan cost associated with given node could include multiple sub-steps. The evaluation could include estimating a future plan cost using a heuristic and calculating a traversed plan cost using a state or set of states derived by an extrapolation engine. The total plan cost for a given node would then be calculated by summing the future plan cost and traversed plan cost.

Approaches that utilize deterministic planners can be combined with approaches in which an identity of the item is determined by the electronic oven. These approaches allow the electronic oven to specifically tailor various aspects of the plan generation and execution process to the item. For example, the extrapolation engine, the cost function, and the heuristic could all be modified based on the identity of the item.

Deterministic Planner—State and Cost Derivation

In approaches in which a control system of the electronic oven utilizes a deterministic planner, the control system may need to produce cost values for specific actions and overall plans in order to generate a plan for heating the item. The cost value can be calculated based on numerous factors related to how the item should be heated. The cost value can be related to the time it takes the item to be heated where longer heating times are associated with higher costs. A simple approach in accordance with this objective would be to have each of the actions taken by the electronic oven designed to consume a set unit of time such as 2 seconds, and evaluate the cost of the plan be simply summing the number of steps taken to traverse a graph space from the origin to a current node under evaluation. However, the cost could also be complex and depend on more than one factor. In some situations, the state of the item at a given node may need to be extrapolated in order to determine the cost of a given plan. For example, an item could be heated very rapidly to reach an average temperature through a sequence of actions that heated a specific point of the item to an unacceptably high temperature which would result in burning or charring of the item at that point. The cost function could be adapted to avoid these kinds of situations, and generally provide a more nuanced approach to heating the item, if the state of the item was extrapolated as part of the evaluation of the cost function.

In approaches in which a deterministic planner using a cost function are utilized, this process may be conducted as part of evaluating the cost function. The state of the item can be derived using an extrapolation engine. The extrapolation engine could be a thermodynamic physics simulator that is able to simulate the effect of certain actions on the item and produce the next state for the item automatically. Since electronic ovens tend to be highly controlled environments, the simulator could provide a recently accurate estimate of the state of an item in response to a set of actions. The identity of the item could be relied on to obtain this information as the simulator would need to know the characteristics of the item in order to accurately simulate and extrapolate its state. The extrapolation engine could extrapolate the state of the item using the identity of the item and a model of how items having that identity respond to heat. The model could be developed specifically for items with that identity instead of relying on a generalized thermodynamic physics simulator. The extrapolation engine could also operate in accordance with FIG. 11 as described immediately below in that a first surface temperature distribution observed in response to one action could be used to extrapolate the state of the item in response to a sequence of additional actions.

Figure 11:
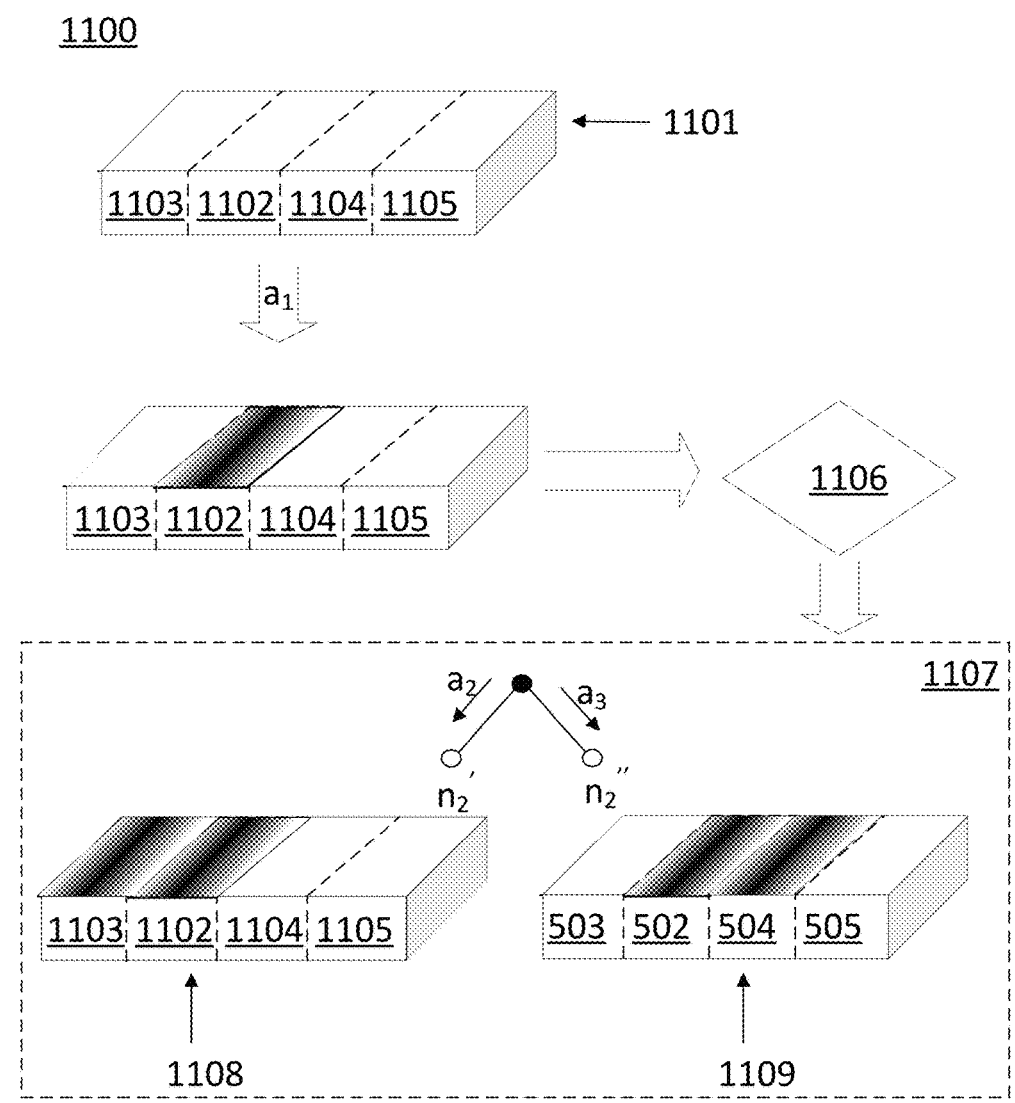
FIG. 11 includes a conceptual diagram of an extrapolation engine utilizing a surface temperature distribution to extrapolate a state of the item in response to a set of actions in accordance with approaches disclosed herein.

FIG. 11 is a conceptual diagram 1100 for how an extrapolation engine could utilize a surface temperature distribution of the item to extrapolate a state of the item. The state of the item could include a planned surface temperature distribution for the item (i.e., a surface temperature distribution that the deterministic planner would expect to see after the performance of a sequence of actions). Item 1101 is illustrated with four segments 1102, 1103, 1104, and 1105. In response to a first action $a_1$, such as the application of energy to the chamber, item 1101 exhibits a first surface temperature distribution in which segment 1102 has been heated, and segments 1103, 1104, and 1105 have not. Action $a_1$ could be executed during a discovery phase of the heating process and could involve the application of a specifically tailored application of energy that is used to explore how item 1101 responds to heat. The discovery phase could be conducted ex ante to any attempt to actually heat the item and could involve obtaining information as to the identity of the item and information to be utilized by the deterministic planner. As such, the discovery phase could be conducted before any plan was generated by the control system. However, action $a_1$ could also just be any application of energy or command executed by the electronic oven during the ordinary course of the electronic oven's operation. Regardless, information 1106 gleaned from the surface temperature distribution could be delivered to an extrapolation engine 1107 for purposes of extrapolating future states of item 1101 in response to various sequences of actions.

The extrapolation engine could utilize information 1106 and knowledge of the set of potential actions that the electronic oven can choose from to extrapolate future states of item 1101 in numerous ways. For example, the extrapolation engine could assume that the heat response of the item will vary proportionally with the intensity of energy applied to the chamber as compared to the intensity of the energy delivered by action $a_1$. The scaling factor for this proportionality could be modified based on an identity of the item which is separately determined as mentioned elsewhere in this disclosure. As another example, the extrapolation engine could assume that the heat response of the item will translate across the item symmetrically with an equal variation of the relative distribution of a pattern of electromagnetic energy in the chamber. This specific example is illustrated by FIG. 11 and is described in the following paragraph. As another example, the extrapolation engine could have a basic model of radiative and convective heat loss over time from a generic item and include that loss of heat when extrapolating the effect of a sequence of actions over time. This model could be altered based on an identity of the item.

In diagram 1100, extrapolation engine 1107 receives information 1106 regarding the surface temperature distribution of item 1101 caused by action $a_1$. The extrapolation engine then uses that information to extrapolate states 1108 and 1109 that would result from an action $a_2$ and an action $a_3$ respectively. In the illustrated case, action $a_2$ corresponds with a leftward shift of the distribution of energy in the chamber by one segment of the item, and action $a_3$ corresponds with a rightward shift of the distribution of energy in the chamber by one segment of the item. The extrapolation engine assumes that the surface temperature distribution will effectively translate symmetrically with the shift of the distribution of energy such that segment 1103 will be heated by action $a_2$ to the same degree segment 1102 was heated by action $a_1$, and segment 1104 will be heated by action $a_3$ to the same degree segment 1102 was heated by action $a_1$.

The example used in FIG. 11 is a simplified example used to illustrate the general principle of how extrapolation engine 1107 can work. The surface temperature distribution resulting from $a_1$ will in practice generally be more complex and less uniform than in the example of FIG. 11. However, by increasing the number of actions available to the oven (e.g., by making the intensity or position variations more granular) and increasing the computational complexity of the extrapolation engine 1107, sufficient performance can be achieved even when highly complex surface temperature distributions are utilized by the extrapolation engine. The types of actions that can be conducted by the oven are discussed in more detail below.

As mentioned previously, the state of the item as extrapolated by the extrapolation engine could then be used to evaluate a function such as in step 1020. Specifically, the planned surface temperature distribution of the item could be used to evaluate a cost function and generate a traversed plan cost for the control system. Returning to the example of FIG. 11, states 1108 and 1109 as extrapolated by extrapolation engine 1107 could be used to determine a cost associated with actions $a_2$ and $a_3$, and a cost of the overall plans that would include those actions. In the case of states 1108 and 1109, the extrapolated states reveal that the same % of the item is heated after each step. Given the same amount of time to conduct each step, a basic cost function might find that the cost of each action was equal. However, the cost function can take numerous other factors into account such as the fact that the areas that have yet to be heated are more diffuse in state 1109 as compared to state 1108 which could be factored into the cost such that action $a_2$ was preferred. Furthermore, if the cost function included a future plan cost, it might be determined that it will be more expensive to complete the heating pattern from node $n_2''$ because 4 more actions will be needed to heat the entire item as compared to only 3 more actions from state $n_2'$.

In some approaches, the cost associated with a given node can be calculated without deriving the state of the item, but more nuanced approaches can utilize an extrapolated state of the item to provide greater control to the deterministic planner. In one situation, cost is simply the number of steps required to complete a plan. The cost function would thereby be at least partially defined by a first term that increased with a plan duration. However, even this approach could benefit from an extrapolated state of the item because the deterministic planner will be able to determine with some degree of accuracy how many steps are actually required to execute a given plan.

The cost of any given plan or action can includes a myriad of other factors. For example, the cost could increase if a temperature distribution across the item increased to an undesirable degree, and the state extrapolation could be used to detect this occurrence. As another example, the cost could spike if a certain portion of the item in an extrapolated state exceeded a set temperature. The function would then be at least partially defined by a term that increases when a surface temperature value in the planned surface temperature distribution exceeded a threshold temperature. As another example, the cost could increase if the entropy of a temperature distribution across the item increased to an undesirable degree, and could increase in proportion to the entropy of the temperature distribution. These approaches could be beneficial because it is generally ineffective, and can be deleterious, to sweep an application of heat back over areas that have already been heated to a desired degree. The various factors utilized by the cost function could each have a linear or non-linear relationship to cost. For example, in the case of a ceiling temperature for specific items, the relationship could be a non-linear increase in cost based on the associated factor crossing a threshold value.

As described elsewhere, the cost function could be dependent upon the identity of the item in these case. For example, if a specific item tended to burn or char at certain heat levels, the cost function could spike if those heat levels were detected on an extrapolated or observed state of the item. As another example, specific items may need to be heated according to a series of phases (i.e., the item needs to be defrosted before being cooked). The cost function could be complex enough to account for these different requirements such as by penalizing the application of high temperature during the defrosting phased, but not during the cooking phase.

The extrapolation engine could be implemented as hardware on the control system such as via a dedicated processor and hard coded ROM. However, the extrapolation engine could also be implemented as software routine stored in firmware on or loaded as software into the control system. The heuristic could also involve a combination of these approaches and could receive updates via additional software routines loaded as software or via firmware. Finally, the extrapolation engine could be implemented partly on the control system actually physically present on the electronic oven and party on a server in communication with the electronic oven. For example, data regarding the surface temperature distribution and identity of the item could be obtained by the electronic oven and preprocessed locally, while the actual extrapolation of states was executed on the server.

Deterministic Planner—Heuristic

In certain approaches that utilize a cost function with a future plan cost, the future plan cost can be provided by a heuristic. The heuristic can essentially provide an estimate of the cost of reaching a desired state without actually considering each of the individual actions needed to reach that state. The heuristic can be less computationally intensive than the extrapolation engine. The heuristic also does not need to know every action that will be taken from the current node to a desired end goal. Instead, the heuristic can provide an estimate for the cost of finishing a plan given the current node as a starting point. The heuristic can provide this estimate using data from the sensors of the electronic oven. For example, the heuristic could utilize information derived from a surface temperature distribution of the item as obtained by an infrared sensor. However, the heuristic could also utilized information derived from a surface temperature distribution produced by the extrapolation engine. The manner by which the heuristic calculates an output future plan cost based on its inputs could be modified based on an identity of the item in the chamber.

If a final surface temperature distribution of an item is the final goal of a given plan, a rough approximation for the additional cost to complete a plan from any given node could be estimated by comparing that final surface temperature distribution against a current surface temperature distribution. To this end, the heuristic could obtain a set of temperature values from a surface temperature distribution of the item. The surface temperature distribution could be extrapolated using an extrapolation engine or sensed using a sensor. The heuristic could then obtain a set of delta values where each delta value corresponded to a temperature value in the set of temperature values and a desired temperature value from the desired final surface temperature distribution. The delta values could then be summed in order to obtain the estimated future plan cost. For example, the estimated future plan cost could be obtained by summing the delta values and multiplying them by a proportionality constant so that the temperature difference was appropriately scaled to the cost function. The heuristic could also take various aspects of the surface temperature distribution and information from other sensors into account when determining the future plan cost.

The heuristic could be implemented as hardware on the control system such as via a dedicated processor and instructions hard coded into ROM. However, the extrapolation engine could also be implemented as a software routine stored in firmware on or loaded as software into the control system. The heuristic could also involve a combination of these approaches and could receive updates via additional software routines loaded as software or via firmware.

Deterministic Planner—Plan Discovery

With a small enough set of potential actions and a basic heating task, it could be possible for an extrapolation engine to simulate every possible sequence of actions that the electronic oven would take, thereby allowing for a cost function evaluation for every potential plan to traverse the graph space. However, for applications involving arbitrary items placed in the electronic oven and a large number of potential actions, some degree of pruning can be done to limit the number of nodes in the graph that are investigated. For example, the extrapolation engine could begin from an initial state and randomly expand out the sequences of actions until multiple paths to the end state were detected and the path with the lowest cost from those multiple paths could be selected. As another example, the expansion out from the initial state could be biased using a heuristic estimate of a future plan value, the calculation of the traversed plan cost at the current node, or some combination of those values. As used herein, expanding out a node refers to extrapolating information for a state that would result by taking one or more actions starting at that node.

Returning to the example in FIG. 5, the evaluation of the cost function could be used to select which sequence of actions to expand upon via a further calculation. As previously described, the surface temperature distribution and an action are used to evaluate a function to determine a plan cost associated $n_2'$ then the same surface temperature distribution and a second action are used to evaluate the function to determine a plan cost associated with node $n_2''$. The plan investigation process could then continue with only extrapolating out other nodes from node $n_2'$ because the plan cost calculated for node $n_2'$ was lower than the plan cost calculated for node $n_2''$. The actual method by which nodes were selected could be more complicated if multiple nodes were available had yet to be explored and were only one action removed from nodes that had been explored. This set of nodes could be referred to as the frontier of the deterministic planner. For example, the discovery process could rank all of the nodes on the frontier by their plan cost, discard the bottom X % and expand the top 1−X %. Alternatively, the discovery process could randomly expand nodes, or periodically switch to an approach in which the nodes were randomly expanded.

In many cases described above, a comparison of a first plan cost to a second plan cost would be used to determine how to expand out the various sequences of actions through the graph space. As such, the cost function and the logic guiding the discovery process could share much in common. For example, the discovery process could favor nodes that lower variation of temperature across the item or nodes that minimize isolated maxima or minima in the temperature distribution. However, benefits accrue to approaches in which the cost function and the logic guiding the discovery process include certain differences. In particular, introducing randomness into the logic guiding the discovery process will assure that the discovery process is not tricked into moving through a path through the graph space that appears to produce a global minimum cost while actually only being a localized minimum. Furthermore, the degree by which the logic for the discovery process is encouraged to branch off may change based on the identity of the item if certain items are more prone to localized minima in the graph space. For example, the proportion of times the discovery process is directed to expand the frontier randomly could be set proportional to a known degree of heat resistivity for items like the one recognized in the electronic oven.

Deterministic Planner—Deviation Detector

Electronic ovens having deterministic planners can also monitor the performance of a plan as it executes and attempt to generate a new plan if too much deviation from the expected performance is detected. The deviation detector could also be used to approaches using the optimization analysis described with reference to FIGS. 3-5. The monitoring process could be conducted continuously as a plan to heat an item is executed. The comparison could use any sensor data available to the control system of the electronic oven and could utilize a comparison based on any of the extrapolated characteristics of the item through the course of the plan's execution.

The extrapolated characteristics of the item could be obtained during the plan discovery process or during the actual plan generation process. In one approach, the extrapolated states of the item corresponding to each node in the graph space could be saved when that node was selected for traversal in the chosen plan. The comparison could then occur at each step of the plan's execution to see if the actual resulting state of the item matched the planned state as extrapolated when the plan was originally being generated.

Figure 12:
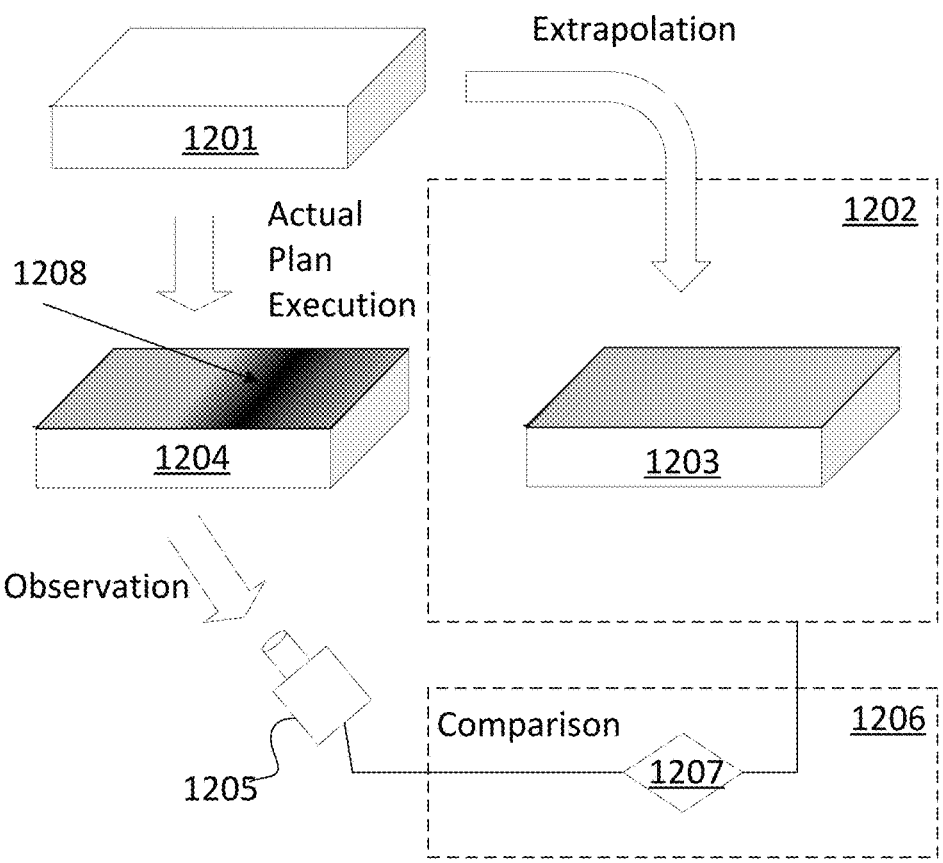
FIG. 12 includes a conceptual diagram of the performance of a derived plan is monitored as it is executed in accordance with approaches disclosed herein.

FIG. 12 is a conceptual diagram 1200 of how the performance of the plan could be monitored. Item 1201 represents an actual physical item placed in a chamber and is illustrated as having a blank surface temperature distribution to indicate that no heat has yet been applied to the item. Extrapolation engine 1202 can then extrapolate state 1203 for the item during a plan generation phase. State 1203 is a state of item 1201 represented in a memory of the control system for the electronic oven. State 1203 can be associated with a specific node in the graph space and a corresponding sequence of actions in a stored plan. Item 1204 represents the same actual physical item as item 1201 except that heat has been applied to the item in the chamber to produce a surface temperature distribution on the item. The surface temperature distribution of the item could be sensed by an infrared sensor 1205. The surface temperature distribution measured by the infrared sensor could be compared to the planned surface temperature distribution associated with state 1203 by a comparator 1207 implemented in a separate memory space 1206 in the control system.

The method of monitoring the plan's performance can continue with detecting a variance during the comparison step. A variance between a planned state for the item and an observed state for the item during the actual execution of the plan can be measured in various ways. In a basic example, a simple delta of sampled values from two surface temperature distributions such as that for item 1204 and state 1203 could be taken and compared to a given threshold for what would be considered an unacceptable variance. In other cases various factors could be considered an unacceptable variance. For example, the appearance of a localized and unplanned hot spot 1208 could be considered an unacceptable variance even if a majority of the surface temperature distribution was in keeping with the extrapolated performance of the plan. In addition, any of the factors that could be used to dramatically penalize the cost function during the plan generation phase can be used to detect an unacceptable variation. Although such factors would be good proxies for determining when a plan needed to be adjusted, a strict variation from the plan, regardless of the occurrence of any risk conditions, is important itself because deviations from the plan could be indicative of more pressing underlying flaws such as a misidentification of the item in the chamber or an item that is experiencing undetectable conditions of greater severity such as an unobservable interior that is not responding as expected.

If a variance is detected during a comparison of the planned state and an actual observed state, the control system can take several responsive actions. First, the deterministic planner can generate a second plan to heat the item in response to detecting the variance. The control system could alternatively shut down the power or switch into a default heating mode like a timed heating routine with an automatic shut off based on the heat of the chamber. The second plan can be generated in the same way the first plan was generated. Alternatively, the second plan can be generated by providing information to the extrapolation engine regarding the variance from the expected performance. The actual observed performance, or a delta of that performance against what was expected, can then in turn be used to improve the performance of the extrapolation engine in future heating tasks. The control system could also issue an alert to a user of a deviation in an expected condition and ask for the user to exert manual control over the heating process.

The control system can also execute another planning phase periodically without reference to any variance from the planned performance. For example, the control system could rerun the planning process every five minutes. The plan could then be immediately switched from the original plan to the new plan. Alternatively, the new plan could be kept in reserve and be ready to be put into place if an unacceptable variance was detected by the control system. This use of the plan held in reserve could be predicated on the stored states associated with the reserved plan being an acceptable match for the actual current performance of the plan.

Control and Training System

Electronic ovens in accordance with this disclosure can include control systems to execute the methods disclosed herein. The controls system can be used to instantiate the evaluative feedback and reinforcement learning systems described above. For example, the control systems can exhibit the features of control system 903 described above. The control systems can also be used to instantiate the optimization analyses described above. The controls system can also be used to instantiate the deterministic planner discussed above including any associated extrapolation engine or heuristic. The control system can be instantiated by a processor, ASIC, or embedded system core. The control system can also have access to a nonvolatile memory such as flash to store instructions for executing the methods described herein. The control system can also have access to a working memory for executing those instructions in combination with a processor. The hardware for instantiating the control system can be located on a printed circuit board or other substrate housed within an electronic oven such as electronic oven 110. The control system could also be partially implemented on a server in communication with the electronic oven 110 via a network. The individual blocks of control system do not need to be instantiated on the same physical device. Individual blocks can be instantiated by separate data storage or physical processing devices.

Figure 13:
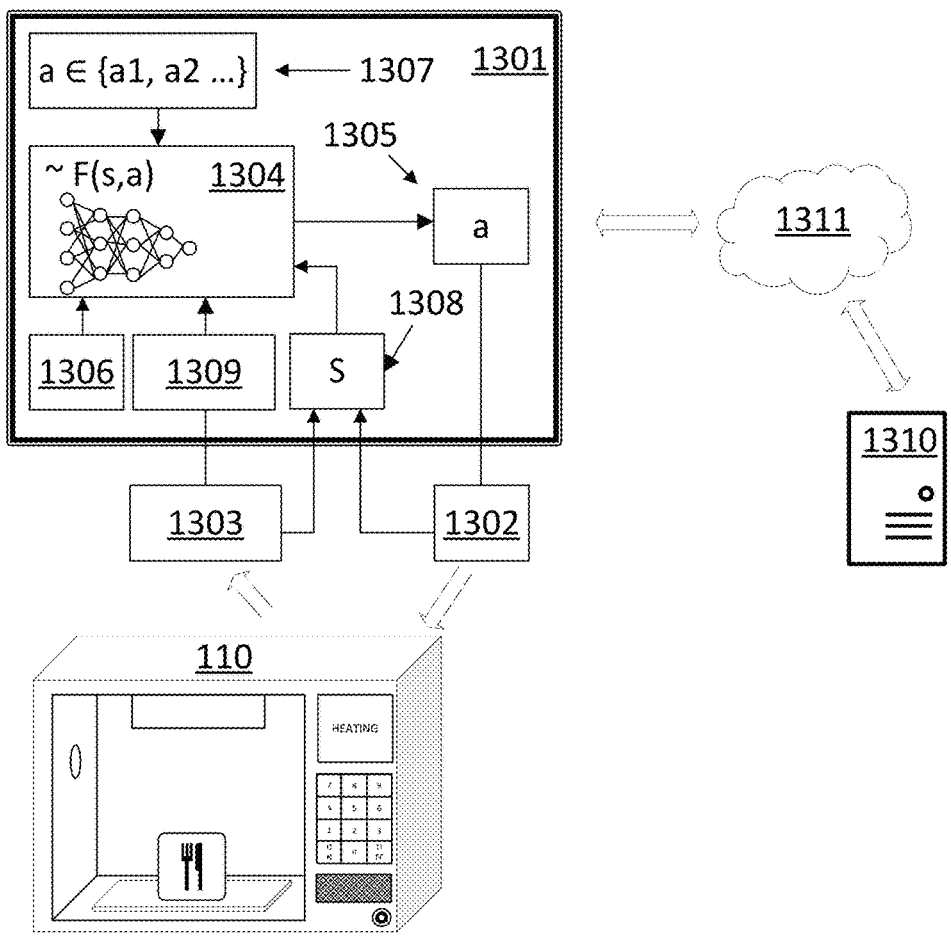
FIG. 13 includes a data flow diagram illustrating a control system for an electronic oven in accordance with the reinforcement learning approaches disclosed herein.

FIG. 13 is a data flow diagram 1300 providing an illustration of the operation of a control system 1301 in accordance with some of the approaches disclosed herein. In particular, control system 1301 is amenable to utilization with the evaluative feedback and reinforcement learning approaches disclosed herein. Control system 1301 can control electronic oven 110 using evaluative feedback. Control system 1301 can generate control information, receive state information regarding the state of electronic oven 110 or an item within electronic oven 110, and adjust the control information based on an evaluation of that state information. As illustrated, control system 1301 can provide control information 1302 to other components of electronic oven 110 in order to implement specific actions. Control system 1301 can receive state data 1303 from other components of electronic oven 110, such as sensors, in order to determine the state of operation of electronic oven 110 or an item within electronic oven 110.

Control system 1301 can utilize a reinforcement learning training system. The training system can include a stored action-value function 1304 that is evaluated with a sensed state and a set of potential actions as inputs to determine an optimal action 1305 to take as an output. Control system 1301 will then generate control information 1302 needed to implement optimal action 1305. The action-value function itself and the system that evaluates the function can be instantiated by a processor and memory on electronic oven 110 or can be instantiated fully or partially on a network accessible server. The values for the action-value function and their correlation to specific states and actions can be stored in a memory 1306. The set of potential actions can be stored in a memory 1307. Memory 1307 and 1306 can be local memories on electronic oven 110 or network accessible memories on a network accessible server. The sensed state can be derived by state derivation system 1308 using state data 1303. The sensed state can also be derived using control information 1302.

After the action defined by control information 1302 has been carried out, control system 1301 can receive a new set of state data 1303 and derive a reward value from that state using reward derivation system 1309. The reward can then be used to update the stored action-value function 1304. The reward derivation system can be instantiated by a processor and memory on electronic oven 110 or can be instantiated fully or partially on a network accessible server. The operation of reward derivation system 1309 is described in more detail below.

In certain approaches, the action-value function 1304 will be a function approximator such as neural network or other back propagation regression model which will serve as the action-value function. The control system can also include a training system for the function approximator. For example, if the training system is a neural network, the specific weights of the network will need to be trained so that the neural network becomes a fair approximation for the action-value function. These weights could then be stored in memory 1306. The training system for the neural networks can be a back-propagation regression training model. The data used to train the network can be the same data sensed by the electronic oven and used by the control system to update the action-value function.

Some of the approaches disclosed herein include a neural network training system that utilizes random samples of past experiences as the training data. In these approaches, the data that is used to update action-value function 1304 needs to be stored for a longer period of time. The data can be stored in a memory or disk on electronic oven 110. However, the data can also be stored on network accessible server 1310 accessible via network 1311.

The data used to train the neural network can be more expansive than the data used to update the action-value function. In particular, the data can comprise a set of experience data points. The experience data point could include data to represent the reward value derived by reward derivation system 1309, the first state used to select the optimal action 1305, the second state derived by state derivation system 1308, and the action 1305 which was used to transfer from the first state to the second state. These experience data points could then be sampled at random to provide a set of training data for the neural network. The training data could be used to train the neural network according to approaches where loss functions are iteratively minimized according to a stochastic gradient dissent evaluation. This approach is beneficial in that the training of the neural network can harvest multiple sets of training data from the same set of physical measurements to increase the speed at which the function approximator is provided.

Network accessible server 1310 could include experience data points collected from multiple electronic ovens which could in turn be used to train the function approximator for multiple electronic ovens. Experience data points can be pushed up to the server from each of the networked electronic ovens to run the training procedure at the server side. However, the training data could also be pushed down from the server to individual ovens to run the training procedure locally. This pooling of training data from each training episode conducted by the network of electronic ovens could greatly increase the speed at which the network of electronic ovens was trained for optimal performance.

Figure 14:
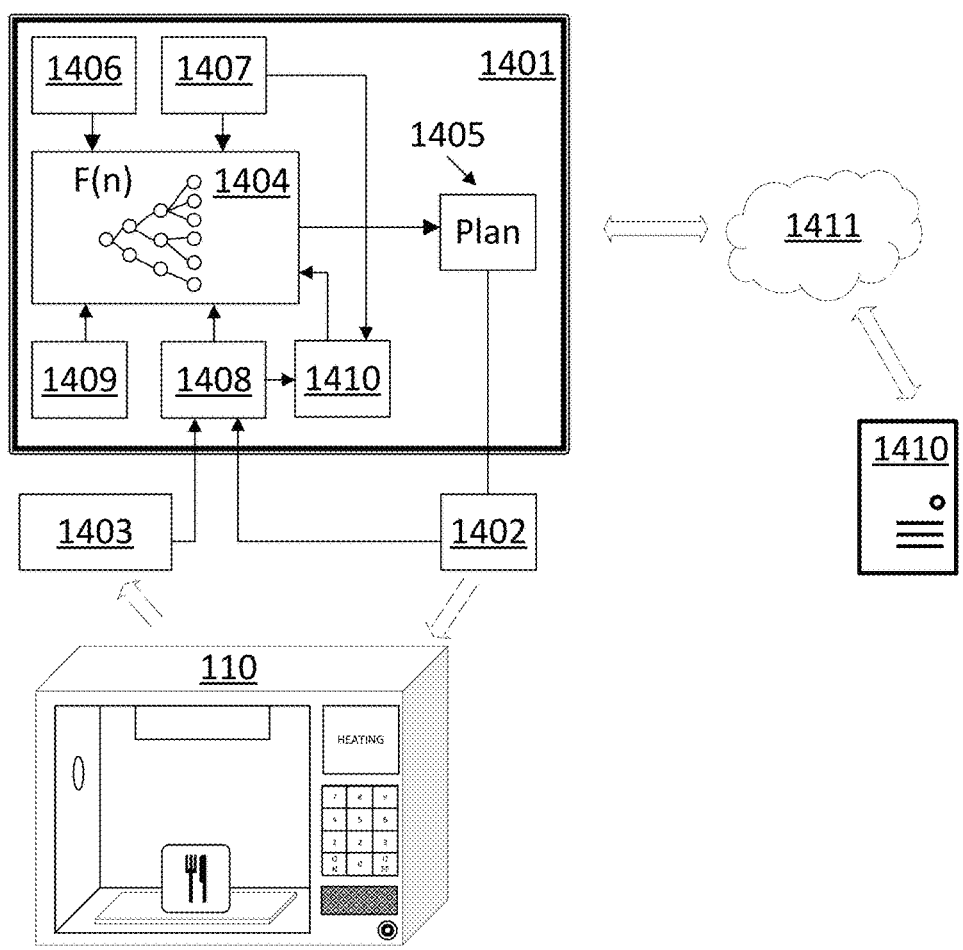
FIG. 14 includes a data flow diagram illustrating a control system for an electronic oven in accordance with the deterministic planner approaches disclosed herein.

FIG. 14 is a data flow diagram 1400 providing an illustration of the operation of a control system 1401 in accordance with some of the approaches disclosed herein. In particular, control system 1401 is amenable to utilization with the deterministic planner approaches disclosed herein. Control system 1401 can control electronic oven 110 by generating a plan and delivering commands to the electronic oven in accordance with that plan. The performance of the plan can also be monitored. Control system 1401 can generate control information, receive state information regarding the state of electronic oven 110 or an item within electronic oven 110, and adjust and determine the performance of the plan based on that state information. As illustrated, control system 1401 can provide control information 1402 to other components of electronic oven 110 in order to implement specific actions in accordance with a generated plan 1405. Control system 1401 can receive state data 1403 from other components of electronic oven 110, such as sensors, in order to determine the state of operation of electronic oven 110 or an item within electronic oven 110.

Control system 1401 can utilize a deterministic planning system to produce a plan for heating an item in the chamber. The deterministic planning system can include a stored cost function 1404 that is evaluated using state data 1403. The system may also use an extrapolation engine 1407, and a heuristic 1406, to evaluate the cost function 1404. Specific nodes in the cost function can be selected for evaluation, and subsequently evaluated, using the extrapolation engine 1407 or heuristic 1406. The control system will generate plan 1405 based on these evaluations, and generate control information 1402 needed to implement plan 1405. The cost function itself and the system that evaluates the function can be instantiated by a processor and memory on electronic oven 110 or can be instantiated fully or partially on a network accessible server. The values for the cost function, the heuristic, the extrapolation engine, and the potential actions the electronic oven can execute can be stored in a memory 1409. Memory 1409 can be a local memory on electronic oven 110 or network accessible memories on a network accessible server. The sensed state can be derived by state derivation system 1408 using state data 1403. The sensed state can also be derived using control information 1402.

After the action defined by control information 1402 has been carried out, control system 1401 can receive a new set of state data 1403 and compare the actual performance of the plan with an expected performance of the plan using a deviation detector 1410. The deviation detector can receive an extrapolated state from extrapolation engine 1407 and compare it to the actual state reached by the item at the point in the plan corresponding to the extrapolated state. The extrapolation engine can be implemented as a dedicated processor, or could be firmware or software executed on the same processor used to instantiate the system that evaluates cost function 1404. The deviation detector can be configured to trigger another evaluation of the cost function given the additional information available to the control system associated with the plan having been partly executed.

Data needed for the operation of the control system can be stored on a memory or disk on electronic oven 110. However, the data can also be stored on network accessible server 1410 accessible via network 1411. For example, the values used to initialize the cost function, extrapolation engine, or heuristic based on an identity of an item placed in the electronic oven can be stored remotely and updated as the system obtains more data. Likewise, data collected by the electronic oven can be uploaded to server 1410 for use by other electronic ovens. In particular, instances where the deviation detector determined that the plan did not lead to an expected extrapolated state could be used to refine the stored values that initialize the extrapolation engine at the network accessible server 1410 for use by other electronic ovens.

State and Reward Derivation

A state derivation system is utilized to obtain feedback from the system in any of the evaluative feedback approaches described above. For example, the state derivation system could be state derivation system 508 or 1408. A reward derivation system, such as reward derivation system 509, is utilized to update the action-value function in a reinforcement learning approach. As used herein, the term state can refer to the actual physical state of the item, the electronic oven, or the overall system. However, the term can also refer to the representation of those states as stored in a memory. In some approaches, the number of actual physical states is much greater than the number of states stored in the memory.

The process for defining a state in memory will generally involve data from sensors, the control system, or from a network connection. The actual physical state of the item is sensed by the sensors described above with reference to FIG. 1 that obtain state sense information, such as 1303 and 1403. The states stored in memory can be defined by data obtained from the sensors. For example, the states can be defined by data regarding a temperature distribution across the item, two dimensional visible light data, three dimensional visible light data, laser monitoring temperature measurements, weight data, humidity data, temperature data, particulate concentration data, return loss data, impedance matching data, applied energy data, and other parameters regarding the physical state of the item, chamber, energy source, or electronic oven generally. The states stored in memory may also be defined by control information.

The state used by the control system can be defined by both factors measured through the use of sensors, such as state sense information 1303, as well as control information, such as control information 1302. In particular, control information in the form of information about the momentum of a particular action could be used to define the state. In general, any action enforced by the control system that includes a directional term or whose behavior with respect to time has both a positive and negative derivative could be beneficially used by the system to define the state.

In certain approaches, sensors would not be needed to obtain control information because the information would be derivable from the commands generated by the control system itself. For example, the state could include a value for the angular momentum of a mode stirrer in the chamber, but the angular momentum would not need to be sensed from the chamber and could instead be passed directly from the portion of the control system responsible for adjusting that angular momentum to the portion of the control system responsible for evaluating and updating the action-value function. This is illustrated by the connection between 1308 and 1302 in FIG. 13. Since the behavior of the mode stirrer in response to applied power could be evaluated and well modeled by the manufacturer, this model could be built into the control system such that the momentum could be derived from the commands used to control the mode stirrer.

The networking interface can also provide information that can be used to determine the state of the item. For example, location data for the electronic oven can be derived by the oven's connectivity and used to derive an altitude for the oven which could be used to define the state of the item. Also, location based information could also serve as an external channel for initializing the control system in order to better identify certain items that are consumed with higher frequencies in certain areas or to cook items according to certain local preferences. The local preferences and geographical consumption patterns could also be obtained as an initial matter by the electronic ovens themselves.

In a particular example, a surface temperature distribution for item 111 could be sensed using an infrared sensor with a view of the item through opening 114. The surface temperature distribution could then be used to identify a state in a memory. Data from multiple sensors, or data from a combination of sensors and control information, could be used in combination to identify a state. For example, both a surface temperature distribution and a three dimensional image of the item could be captured using infrared and visible light sensors with a view of the item, and both the distribution and image could be used to identify the state. In another example, both a surface temperature distribution and a momentum of a movable tray holding the item as calculated using control information used to control a motor for the tray could be utilized to identify the state. As another example, both a current location of applied energy and an impedance matching characteristic for the applied power could be utilized to identify the state.

The states can be defined via a derivation procedure that takes in raw data from the sensors and delivers the processed data to the control system. This step is optional, as in certain cases the data can be delivered directly to the control system. For example, an infrared sensor can directly deliver a matrix of values for the IR intensity sensed by each pixel in the sensor to the control system. However, the raw pixel values could also be strategically down-sampled to ease the computational constraints placed on the control system. The raw data could also be processed so that the control system would receive a matrix of IR intensity values that correspond directly to the surface area of the item as if that surface area were flattened from a three dimensional shape into a two dimensional plane. More complex derivation procedures could be applied to provide an optimum degree of information to the control system with which the states could be defined.

Figure 15:
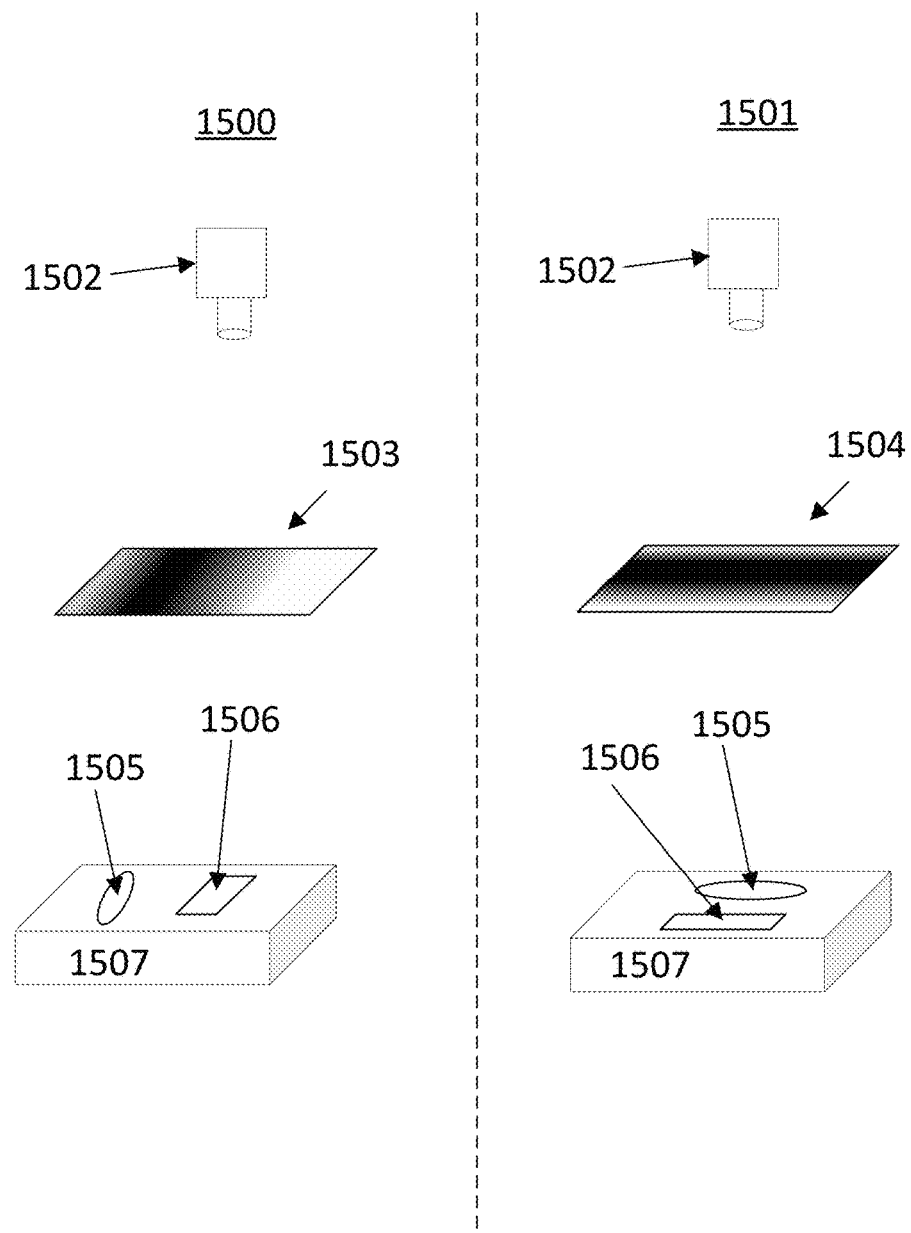
FIG. 15 includes a conceptual diagram of an aspect of a state derivation system in accordance with approaches disclosed herein.

FIG. 15 provides an illustration of a more complex derivation procedure that can be used to process raw sensor data regarding an item in order to define states in memory. FIG. 15 includes two sets of images 1500 and 1501 that correspond to the same system at two different times where image 1500 corresponds to t=0 and image 1501 corresponds to t=1. In both images, an infrared sensor 1502 obtains a surface temperature distribution. Surface temperature distribution 1503 is obtained at t=0. Surface temperature distribution 1504 is obtained at t=1. Both surface temperature distributions correspond to the same item in the chamber. In this case, the item is a set of items 1505 and 1506 on a movable tray 1507. As illustrated, tray 1507 has been rotated 90° from t=0 to t=1.

A reinforcement learning system could treat surface temperature distributions 1503 and 1504 as the state of the system without regard to the relative movement of the items 1505 and 1506 in the chamber. However, in certain approaches it might be beneficial to alleviate this degree of complexity for the control system by defining the states using information regarding the position of the items and the surface temperature distribution. This can be done in numerous ways and the following examples are provided for purposes of explaining how more complex derivations can alleviate strain on the control system and not as a limitation on how the control system is provided with information in all instances.

In one example, infrared sensor 1502 could also obtain visible light images of items 1505 and 1506. This data would serve as part of the state sense data, such as state sense data 1303. The information could then be used by a state derivation system, such as state derivation system 1308, to map surface temperature distributions from their raw values to distributions for items 1505 and 1506 themselves.

As another example, the control system could provide control information from which the position of tray 1507 could be derived. This information could serve as control information, such as control information 1302. The information could then be used to transpose the surface temperature distributions to cancel out the effect of the movement of the tray at a state derivation system, such as state derivation system 1308, before the surface temperature distributions are used to define the states for the control system as utilized by an action-value function 1304 or a cost function 1404.

Other more complex derivations are possible through the combination of multiple streams of data. For example, the state could include a classifier that actually identified a particular item in the oven against a library of stored items that are commonly placed in a microwave. The state could include placeholders for multiple items that could be placed in the microwave and could track individual characteristics of each item separately.

The actual physical state of an item placed in a microwave can vary from the state as defined by the control system. This occurrence can be referred to as the hidden state issue. In certain approaches, the state will be defined from a measurement directed at the surface of the item, and the temperature of the interior of the item will only be known indirectly. However, the interior characteristics of an item may vary while the outward appearance remains constant so that the same surface measurement will be indicative of different internal states. In approaches in which only the surface temperature was monitored, this could lead to the hidden state problem.

The reinforcement learning approach described above provides certain benefits with respect to the hidden state problem because it can operate on reward signals that are noisy and delayed. Eventually, the internal state of the item will be determined. In various approaches the internal state will be determined when it is ultimately expressed on its surface through the diffusion of heat, or when the item is removed from the chamber and evaluated. Regardless, the updating of the action-value function for previous states provides a rapid manner for incorporating this information back into the control system and allows the control system to recognize hidden states and explore options for alleviating their effects.

Aside from being used to evaluate the action value function, the information obtained regarding the state of the item can also be used to derive a reward for updating the action-value function. This action can be conducted by a reward derivation system, such as reward derivation system 509. Indeed, any information gleaned by the system regarding the state of the item can be used to derive a reward. Rewards can be positive or negative. In a specific example, a positive reward can be derived for each state based on an evenness of cook determination. The determination can involve evaluating the surface temperature distribution for the item and evaluating the variance of temperature values across the distribution. Rewards can be derived from how many points in the distribution compare to a sigmoid function where positive rewards are provided for low magnitude points on the sigmoid. As another example, negative rewards can be provided when a visible light detector identifies that a spill has occurred. Large negative rewards can be derived when smoke is detected in the chamber.

In addition to data used to define the state of the item, rewards can be derived from numerous other data sources. For example, rewards can be derived from the time it takes to heat an item to a desired degree where rapid heating is associated with positive rewards. Rewards can also be provided via user feedback after the item has been cooked. For example, a prompt could appear on the display or be transmitted by a speaker on the device to prompt the user to report on how well the heating was conducted. As another example, a prompt could be sent to a user's mobile phone to request a response regarding how well the item was heated. The reward could then be derived based on the user's response.

Actions

The example electronic ovens described with reference to FIG. 1 can conduct various actions as part of the process of obtaining evaluative feedback or as part of generating a plan to heat the item. In approaches in which the evaluative feedback is used to train a reinforcement learning training system these actions can be inputs to the action-value function of the training system. In approaches using a deterministic planner, these actions can be the actions that make up a plan and travers a graph of the plan space. In approaches using the optimization analyses discussed above, these actions could be the applications of energy and changes in configuration of the electronic oven that are used to place the item in a given condition and monitor its response.

Generally, as described above, one set of actions include the ability to alter the relative position of item from a first position value to a second position value with respect to a local maxima created by the variable distribution of energy delivered to chamber by an energy source. To this end, tray 118 may be rotatable around one or more axes. Tray 118 may also be linearly movable in two dimensions along the bottom of chamber 112. Tray 118 may indeed be larger than the bounds of chamber 112 and pass underneath the walls of the chamber as it moves in order to move item 111 through a greater area. Tray 118 may also be movable in the z-direction up and down with respect to the base of chamber 112. In the alternative or in combination, the variable distribution of energy provided by source 113 may be movable as will be described in more detail below.

Other actions that can be executed by an example control system include adjusting the characteristics of the energy provided to the chamber such as by cycling the power applied to energy source 113 on and off or adjusting the power applied in graded steps between a maximum and minimum level. In other approaches, the frequency of the energy applied to chamber 112 can be modified. In other approaches, additional heat sources can be applied to the chamber in combination or in the alternative to the energy applied by energy source 113. Furthermore, water or other materials can be intermittently introduced into the chamber to alter the effect of the energy introduced to chamber 112 on item 111. As another example, a susceptor could be periodically introduced to the chamber to create higher temperature reactions. The susceptor could be movable within the chamber and could be occasionally placed in close proximity to certain items to cause Maillard reactions or other effects only achievable at high temperatures. Other actions that can be executed by an example control system include moving a stirrer or other agitator in the chamber that is configured to adjust the position and composition of the item during heating. The agitator could be placed within an item. In certain approaches the agitator will comprise material that is transparent to microwave energy. In other approaches, the agitator will be the susceptor mentioned above.

Another action the control system can execute is moving the variable distribution provided by energy source 113 relative to the chamber 112 itself. This action can be achieved in numerous ways. Example of how the variable distribution's position can be altered are provided in U.S. Provisional Patent App. No. 62/315,175 filed on Mar. 30, 2016, 62/349,367 filed on Jun. 13, 2016, and 62/434,179 filed on Dec. 14, 2016, all of which are incorporated by reference herein in their entirety for all purposes. For example, the variable distribution can be altered within the chamber relative to the item by adjusting the physical configuration of a set of variable reflectance elements such as variable reflectance element 200 in FIG. 2.

Another example of how the control system can execute the action of moving the variable distribution with respect to the chamber is by utilizing an array of antennas or energy sources. The individual elements in the array could be supplied with variable levels of energy instantaneously to alter the characteristics of the delivered energy by forming waves that cohere and interfere at different points.

Another action that can be conducted by the control system involves the combination of altering the pattern of energy distribution relative to the chamber itself and also altering the amount of energy supplied. By targeting a specific location on or within the item, and monitoring RF parameters such as the return loss and impedance matching, the reaction of that portion of the item to the delivered energy can be monitored. These characteristics, combined with knowledge regarding how the item responds to heat, can be utilized to measure how the heating process is progressing.

Any of the actions mentioned above can be stored by the control system for selection by a deterministic planner when generating a plan to heat the item. The potential items the planner can select from can be referred to as the action set of the electronic oven. The actions for the deterministic planner can include various set degrees in terms of their individual durations or physical extents. For example, the actions set could be defined such that each action took the same amount of time to execute (e.g., the actions associated with rotating a tray π/8 radians or increasing the intensity of the energy source by 10% could be selected for the action set because they take the same amount of time). These approaches would alleviate one constraint on the cost function because the cost function would be able to calculate a total plan time by simply adding the number of actions taken. However, the cost function could also be defined to account for the time it took to execute any given action. Alternatively, the actions could be defined so that they had fixed durations or intensities without reference to preserving any sort of symmetry between the various actions in the action set. These approaches would also alleviate the computation complexity of the deterministic planner as a whole because they would limit the set of potential actions that would need to be explored and extrapolated. An alternative approach in which the actions have varying durations or intensities is possible, and could provide certain benefits in terms of the flexibility afforded to the planner, but would also increase the complexity of the extrapolation engine.

Control System Initialization

The control system can be initialized based on an identity of the item placed in the chamber. The item could be identified by analyzing the response of the item to an application of energy using infrared data as well as visual light sensor data obtained from a visual light sensor. The control system can be initialized based on the category of the item matching a specific category or could be initialized based on the specific item. For example, the item could be identified as a non-viscous homogenous liquid, or it could be identified as a cup of tea. The control system could then be initialized based on this identification. The control system could include a default configuration if the item is not identified. The control system could also have different configurations based on different levels of specificity as to the characteristics of the item. For example, the control system could have both a cup-of-tea configuration and a non-viscous homogenous liquid configuration and could fall back on the more general configuration if the identification of the tea was not conducted properly.

Figure 16:
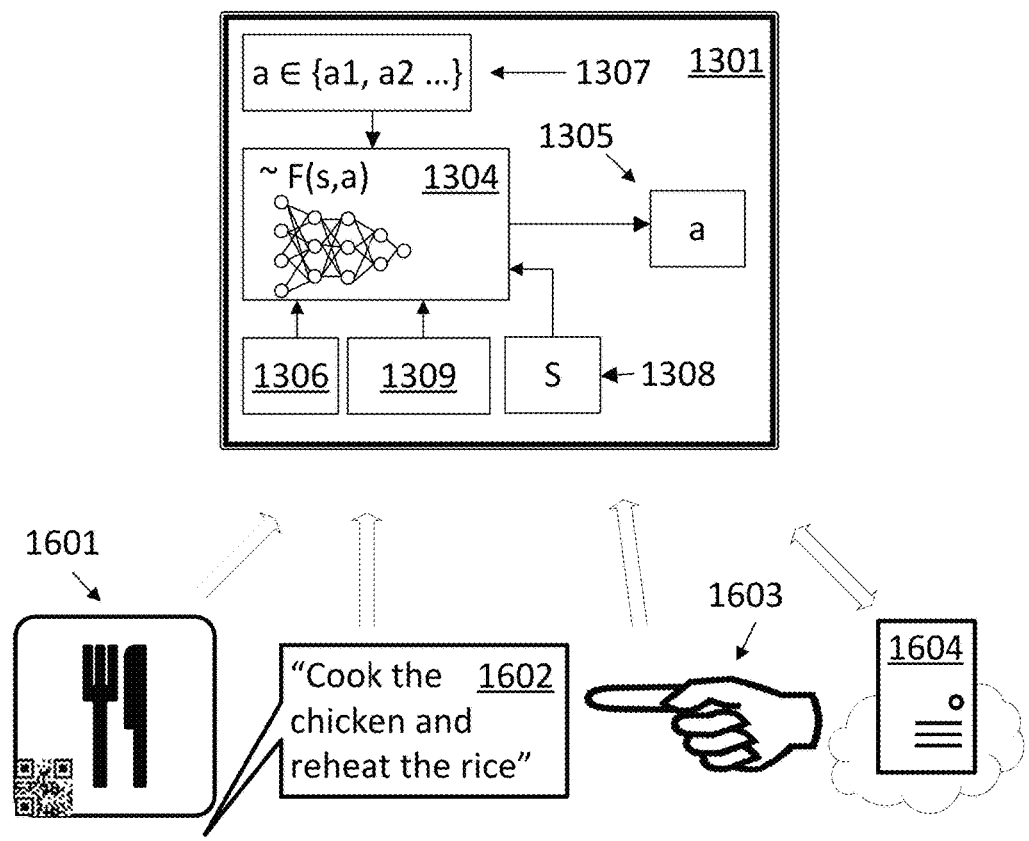
FIG. 16 includes a data flow diagram illustrating the initialization of the control system in FIG. 13 using data from external channels.

FIG. 16 is a data flow diagram illustrating the initialization of control system using data from external channels. Data from external channels can be used to initialize any of the control systems disclosed herein including those associated with deterministic planners, reinforcement learning approaches, and the optimization analysis discussed above. However, for explanatory purposes, FIG. 16 illustrates the initialization of a control system for a reinforcement learning approach as disclosed with reference to FIG. 13.

Data from external channels can provide information for initializing control system 1301 for a heating or training episode. These channels can also be utilized to initialize any of the aspects of the control system that have been described elsewhere in this document as being configurable based on an identity of the item. The external channels are illustrated as a QR code on a package 1601, a voice command 1602, a touch input 1603, and network data 1604. Data from external channels can include data transmitted through a scanner used to read a UPC or QR code on the packaging of an item to be heated, a keypad command entered on a traditional keypad, a command entered on the user interface of a touch screen, a voice command entered on a microphone of the electronic oven, or a camera combined with an image recognition classifier. In general, the data channels can include any method for entering commands or information to electronic oven 110 from an external source. Network data 1604 can include information provided from a manufacturer of electronic oven 110 or from a user of electronic oven 110 that is providing control information indirectly via a local network or the Internet. The information could be provided through the network via a device with the various input channels described above with reference to control panel 119, such as a mobile phone with a touch screen, microphone, and camera.

Once the data is received, it is used by electronic oven 110 to initialize certain aspects of control system 1301. For example, the action-value function itself can be initialized by altering the set of values and correlations stored in memory 1306. This could involve setting the weights and overall characteristics of a neural network function approximator for the action-value function stored in memory 1306. The behavior of state derivation system 1308 and reward derivation system 1309 could also be initialized or altered by the received data. The states used by control system 1301 could themselves be altered such as by adjusting them to independently track the state of individual components of the item in the chamber. In a specific example, the external channel could identify the items as a combination of chicken needing cooking and rice needing reheating. As a result, the states used by control system 1301 and state derivation system 1308 could be initialized to keep track of the two separate components. The data used to represent the state could be altered to include two separate vectors for each component. The reward procedure could be altered to reward slow gradual heating of the chicken and light heating of the rice.

In general, any aspect of control system 1301 including the characteristics of the reinforcement learning training system or the training system used to train the function approximator could be initialized via data from external channels. For example, the reinforcement learning training system could be initialized based on data from an external channel such as adjusting the probability of taking an action-value maximizing action as opposed to an exploratory action.

Another external channel for information could be a preprogrammed calibration procedure used to analyze the item in the chamber. The calibration procedure could be the same process used in the discovery phase of the deterministic planner and optimization analyses described elsewhere herein. The electronic oven could be configured to rapidly heat the item or apply water to the chamber and study the reaction of the item to that stimulus to obtain information that can be used to initialize the control system. For example, the item could be heated with an application of electromagnetic radiation, and the change in surface temperature distribution could be analyzed across a short period of time to determine the heat resistivity of the item. In response to determining that the heat resistivity was high, the control system for a deterministic planner or reinforcement learning approach could be initialized with a high probability of taking exploratory steps in order to address potential hidden state problems with such items. Indeed, the response of the item to the above-mentioned stimuli could be used by any classification system with access to a corpus of information regarding the responses of different materials to those stimuli in order to identify the item for the control system. As a specific example, different foods may exhibit different cooling curves in response to an application of heat, and monitoring the change in temperature of the item in the chamber over time in response to a given stimulus could provide enough information to enable a trained classifier to recognize the item. In a similar example, the change in surface temperature distribution after receiving the application of energy could be analyzed to supply the extrapolation engine for a deterministic planner approach with information regarding how the item was both heated and subsequently cooled in order to accurately extrapolate the state of the item for the deterministic planner in response to various potential actions.

Although specific examples of utilizing data from external channels were provided above, in most approaches, the control system, such as control system 1301, can operate with very little data from external channels. Much of the data described above could in fact be discovered by, and incorporated into, the operation of control system 1301 itself. For example, although an external channel could identify an item as cooked chicken in need of reheating or frozen chicken that would need to be thawed and fully cooked, control system 1301 could also learn to identify the items and carry out the proper heating procedure to bring both items to the desired state without external input. The same action-value function and set of states could be utilized for both the thawing and cooking task and the reheating task. Although the number of states and computational complexity of an approach which did not provide external data would be greater, the provisioning of external data is not necessary.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within the electronic oven or a network accessible memory. Although examples in the disclosure included heating items through the application of electromagnetic energy, any other form of heating could be used in combination or in the alternative. The term "item" should not be limited to a single homogenous element and should be interpreted to include any collection of matter that is to be heated. These and other modifications and variations to the present invention may be practiced by those skilled in the art, without departing from the scope of the present invention, which is more particularly set forth in the appended claims.

Reference has been made in detail to embodiments of the disclosed invention, one or more examples of which are illustrated in the accompanying drawings. Each example was provided by way of explanation of the present technology, not as a limitation of the present technology. In fact, it will be apparent to those skilled in the art that modifications and variations can be made in the present technology without departing from the scope thereof. For instance, features illustrated or described as part of one embodiment may be used with another embodiment to yield a still further embodiment. Thus, it is intended that the present subject matter covers all such modifications and variations within the scope of the appended claims and their equivalents.

What is claimed is:

1. A non-transitory computer-readable medium storing instructions to execute a computer-implemented method for heating an item in a chamber of an electronic oven towards a target state comprising:
   heating the item with a set of applications of energy to the chamber while the electronic oven is in a respective set of physical configurations;
   sensing, using an infrared sensor, sensor data that defines a respective set of responses by the item to the set of applications of energy;
   generating a plan to heat the item in the chamber, wherein the generating is conducted by a control system of the electronic oven, and wherein the generating uses the sensor data;
   conducting an optimization analysis to produce an optimization output; and
   compiling a sequence of commands using the optimization output;
   wherein the optimization analysis uses: (i) a convex optimization solver; (ii) data representing the target state; and (iii) data representing the respective set of responses;
   wherein the electronic oven executes the sequence of commands to heat the item towards the target state; and
   wherein the set of applications of energy and respective set of physical configurations define a respective set of variable distributions of energy in the chamber.

2. The non-transitory computer-readable medium of claim 1, wherein:
   the optimization output includes an error value and a duration vector;
   the duration vector includes a set of durations for the electronic oven to be in each of the physical configurations in the respective set of physical configurations;
   the error value quantifies a difference between the target state and an extrapolated end state; and
   the convex optimization solver sets the duration vector to minimizes the error value.

3. The non-transitory computer-readable medium of claim 2, wherein the computer-implemented method further comprises:
 segmenting the item into a set of segments;
 wherein the convex optimization solver is a non-negative least squares solver;
 wherein the data representing the target state is a target state vector;
 wherein the target state vector includes a set of target temperature values corresponding to the set of segments;
 wherein the data representing the respective set of responses is a set of response vectors; and
 wherein each response vector in the set of response vectors is a set of temperature derivatives corresponding to the set of segments.

4. The non-transitory computer-readable medium of claim 3, wherein the computer-implemented method further comprises:
 identifying the item using a classifier and the set of response vectors.

5. The non-transitory computer-readable medium of claim 2, wherein the sequence of commands:
 transitions the electronic oven between the physical configurations in the respective set of physical configurations;
 applies the applications of energy; and
 assures the electronic oven is in each of the physical configurations in the respective set of physical configurations for a duration that is proportional to a respective element in the duration vector.

6. The non-transitory computer-readable medium of claim 2, wherein the computer-implemented method further comprises:
 determining that the error value exceeds an acceptable error value;
 heating the item with an application of energy while the electronic oven is in an additional physical configuration, wherein the additional physical configuration is selected upon determining that the error value exceeds the acceptable error value;
 sensing, using the infrared sensor, sensor data that defines a respective response by the item to the application of energy;
 conducting a second optimization analysis to produce a second optimization output; and
 compiling a second sequence of commands using the second optimization output;
 where the second optimization analysis uses: (i) the convex optimization solver; (ii) data representing the target state; (iii) data that represents the respective set of responses; and (iv) data that represents the respective response.

7. The non-transitory computer-readable medium of claim 1, wherein the computer-implemented method further comprises:
 executing a command in the sequence of commands, wherein the command returns the electronic oven to a physical configuration in the respective set of physical configurations;
 executing a second command in the sequence of commands, wherein the command applies an application of energy to the chamber while the electronic oven is in the physical configuration; and
 sensing, using the infrared sensor, additional sensor data that defines a response by the item to the application of energy;
 conducting a second optimization analysis to produce a second optimization output; and
 compiling a second sequence of commands using the second optimization output;
 wherein the second optimization analysis uses: (i) the convex optimization solver; (ii) the data representing the target state; and (iii) the additional sensor data.

8. The non-transitory computer-readable medium of claim 1, wherein the computer-implemented method further comprises:
 periodically conducting additional iterations of the optimization analysis while the item is being heated toward the target state;
 wherein a period between the additional iterations is greater than 3 seconds and less than 15 seconds.

9. The non-transitory computer-readable medium of claim 1, wherein the computer-implemented method further comprises:
 generating a second plan to heat the item in the chamber, wherein the generating of the second plan is conducted by the control system of the electronic oven, and where the generating of the second plan uses a deterministic planner;
 wherein a cost function of the deterministic planner uses the plan as a heuristic to estimate a future plan cost for the second plan.

10. The non-transitory computer-readable medium of claim 9, wherein the computer-implemented method further comprises:
 automatically heating the item in the chamber towards the target state using a reinforcement learning system;
 wherein the second plan is used as a policy for the reinforcement learning system.

11. The non-transitory computer-readable medium of claim 1, wherein the computer-implemented method further comprises:
 altering a reflective element in a set of reflective elements to transition between a first and second physical configuration in the respective set of physical configurations;
 wherein the chamber is wholly motionless during each application of energy;
 wherein the set of reflective elements includes at least three reflective elements; and
 wherein the control system generates commands that independently alter the reflective elements in the set of reflective elements.

12. The non-transitory computer-readable medium of claim 11, wherein:
 an application of energy to the chamber from the set of applications of energy introduces a polarized electromagnetic wave to the chamber;
 altering the reflective element alters an orientation of the reflective element from a first orientation to a second orientation;
 wherein a dominant polarization of the polarized electromagnetic wave is perpendicular to the first orientation; and
 wherein the dominant polarization of the polarized electromagnetic wave is parallel to the second orientation.

13. The non-transitory computer-readable medium of claim 1, wherein the computer-implemented method further comprises:
 segmenting the item into a set of segments using data from the infrared sensor;
 wherein the convex optimization solver is a non-negative least squares solver;

wherein the data representing the target state is a target state vector;
wherein the target state vector includes a set of target temperature values corresponding to the set of segments;
wherein the data representing the respective set of responses is a set of response vectors; and
wherein each response vector in the set of response vectors corresponds to the set of segments.

14. The non-transitory computer-readable medium of claim 13, wherein:
the set of segments includes at least 10 elements; and
the respective set of physical configurations includes at least 10 distinct physical configurations.

15. The computer-implemented method of claim 1, wherein:
during each application of energy in the set of applications of energy, a respective physical configuration in the respective set of physical configurations is held for at least 0.5 seconds; and
the respective set of physical configurations includes at least 5 distinct physical configurations.

16. A computer-implemented method for heating an item in a chamber of an electronic oven towards a target state comprising:
heating the item with a set of applications of energy to the chamber while the electronic oven is in a respective set of configurations;
sensing, using an infrared sensor, sensor data that defines a respective set of responses by the item to the set of applications of energy; and
generating a plan to heat the item in the chamber, wherein the generating: (i) is conducted by a control system of the electronic oven; (ii) uses the sensor data; (iii) includes conducting an optimization analysis to produce an optimization output; and (iv) includes compiling a sequence of commands using the optimization output;
wherein the optimization analysis uses: (i) a convex optimization solver; (ii) data representing the target state; and (iii) data representing the respective set of responses; and
wherein the electronic oven executes the sequence of commands to heat the item towards the target state.

17. The computer-implemented method of claim 16, wherein:
the respective set of configurations include at least 5 distinct physical configurations;
each application of energy is at least 0.5 seconds in duration; and
the set of applications of energy and respective set of configurations define a respective set of variable distributions of energy in the chamber.

18. The computer-implemented method of claim 16, further comprising:
the optimization output includes an error value and a duration vector;
the duration vector includes a set of durations for the electronic oven to be in each of the configurations in the respective set of configurations;
the error value quantifies a difference between the target state and an extrapolated end state; and
the convex optimization solver sets the duration vector to minimizes the error value.

19. The computer-implemented method of claim 18, wherein the sequence of commands:
transitions the electronic oven between the physical configurations in the respective set of physical configurations;
applies the applications of energy; and
assures the electronic oven is in each of the physical configurations in the respective set of physical configurations for a duration that is proportional to a respective element in the duration vector.

20. The computer-implemented method of claim 18, further comprising:
determining that the error value exceeds an acceptable error value;
heating the item with an application of energy while the electronic oven is in an additional physical configuration, wherein the additional physical configuration is selected upon determining that the error value exceeds the acceptable error value;
sensing, using the infrared sensor, sensor data that defines a respective response by the item to the application of energy;
conducting a second optimization analysis to produce a second optimization output; and
compiling a second sequence of actions using the second optimization output;
where the second optimization analysis uses: (i) a convex optimization solver; (ii) data representing the target state; (iii) data that represents the respective set of responses; and (iv) data that represents the respective response.

21. The computer-implemented method of claim 16, further comprising:
segmenting the item into a set of segments;
wherein the convex optimization solver is a non-negative least squares solver;
wherein the data representing the target state is a target state vector;
wherein the target state vector includes a set of target temperature values corresponding to the set of segments;
wherein the data representing the respective set of responses is a set of response vectors; and
wherein each response vector in the set of response vectors is a set of temperature derivatives corresponding to the set of segments.

22. The computer-implemented method of claim 21, further comprising:
identifying the item using a classifier and the set of response vectors.

23. The computer-implemented method of claim 16, further comprising:
periodically conducting the optimization analysis while the item is being heated toward the target state;
wherein a period for the periodic conducting of the optimization analysis is greater than 3 seconds and less than 15 seconds.

24. The computer-implemented method of claim 16, further comprising:
executing a command in the sequence of commands, wherein the command returns the electronic oven to a physical configuration in the respective set of physical configurations;
executing a second command in the sequence of commands, wherein the command applies an application of energy to the chamber while the electronic oven is in the physical configuration; and sensing, using the infrared sensor, additional sensor data that defines a response by the item to the application of energy;

conducting a second optimization analysis to produce a second optimization output; and compiling a second sequence of commands using the second optimization output;

wherein the second optimization analysis uses: (i) the convex optimization solver; (ii) the data representing the target state; and (iii) the additional sensor data.

25. The computer-implemented method of claim 16, further comprising:

generating a second plan to heat the item in the chamber, wherein the generating of the second plan is conducted by the control system of the electronic oven, and where the generating of the second plan uses a deterministic planner;

wherein a cost function of the deterministic planner uses the plan as a heuristic to estimate a future plan cost for the second plan.

26. The computer-implemented method of claim 25, further comprising:

automatically heating the item in the chamber towards the target state using a reinforcement learning system;

wherein the second plan is used as a policy for the reinforcement learning system.

27. The computer-implemented method of claim 16, further comprising:

altering a reflective element in a set of reflective elements to transition between a first and second physical configuration in the respective set of physical configurations;

wherein the chamber is wholly motionless during each application of energy;

wherein the set of reflective elements includes at least three reflective elements; and wherein the control system generates commands that independently alter the reflective elements in the set of reflective elements.

28. The computer-implemented method of claim 27, wherein:

an application of energy to the chamber from the set of applications of energy introduces a polarized electromagnetic wave to the chamber;

altering the reflective element alters an orientation of the reflective element from a first orientation to a second orientation;

wherein a dominant polarization of the polarized electromagnetic wave is perpendicular to the first orientation; and wherein the dominant polarization of the polarized electromagnetic wave is parallel to the second orientation.

29. The computer-implemented method of claim 16, further comprising:

segmenting the item into a set of segments using data from the infrared sensor;

wherein the convex optimization solver is a non-negative least squares solver;

wherein the data representing the target state is a target state vector;

wherein the target state vector includes a set of target temperature values corresponding to the set of segments;

wherein the data representing the respective set of responses is a set of response vectors; and wherein each response vector in the set of response vectors corresponds to the set of segments.

30. The computer-implemented method of claim 29, wherein:

the set of segments includes at least 10 elements; and the respective set of physical configurations includes at least 10 distinct physical configurations.

* * * * *